Oct. 11, 1966　　　J. F. VERHOEVEN　　　3,277,569
ARTICLE HANDLING AND STORAGE MECHANISM
Filed July 2, 1964　　　　　　　　　　　　13 Sheets-Sheet 2
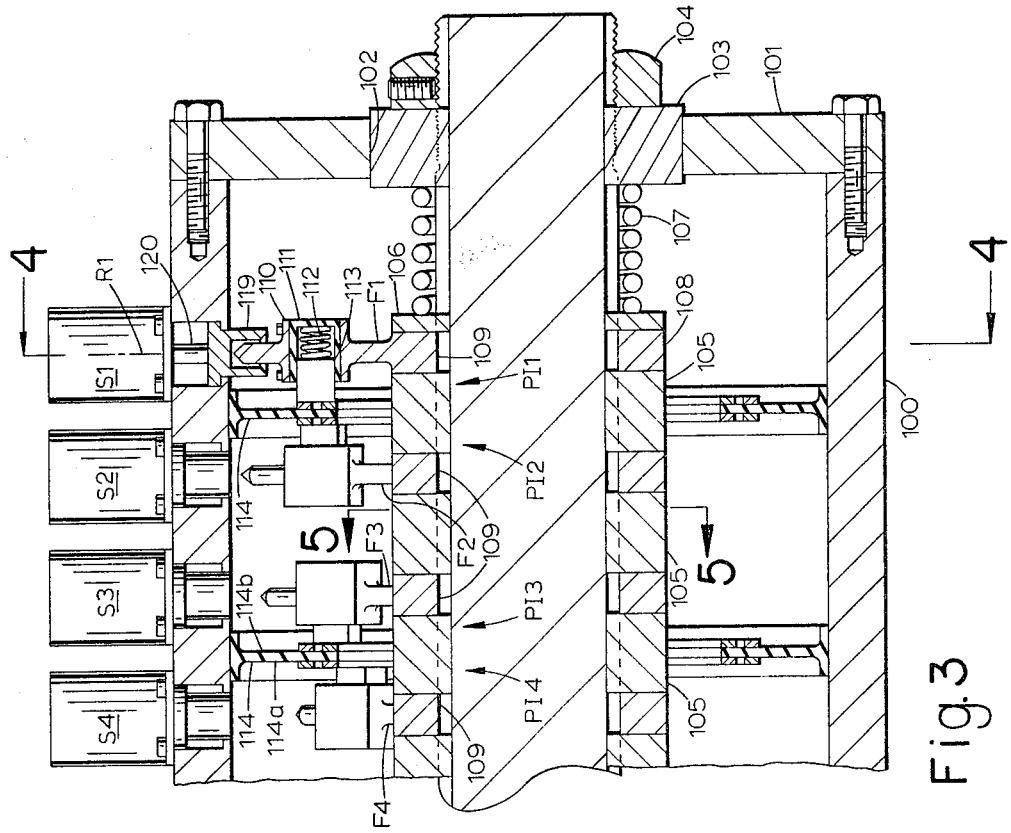
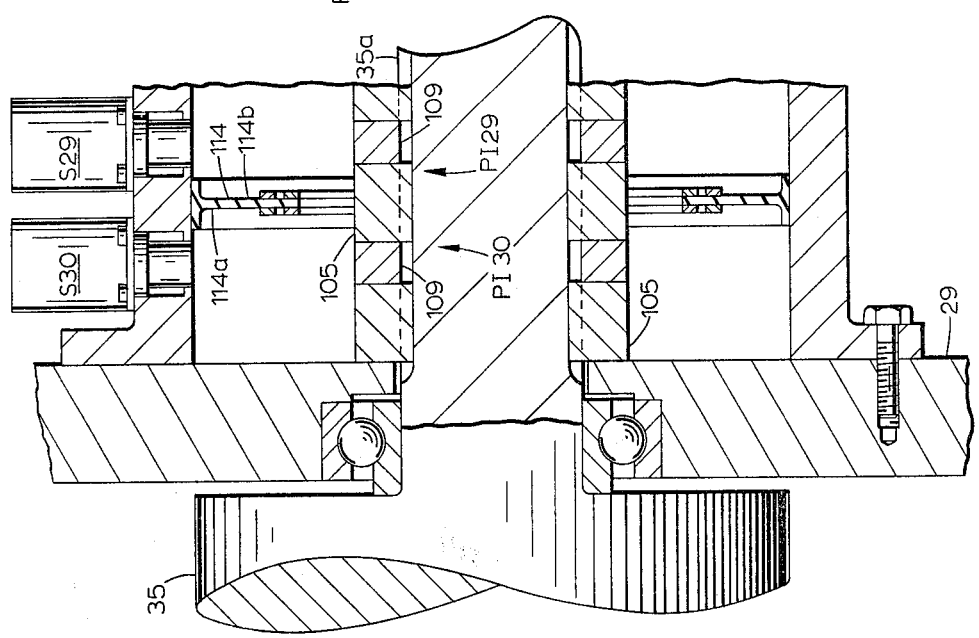
Fig. 3

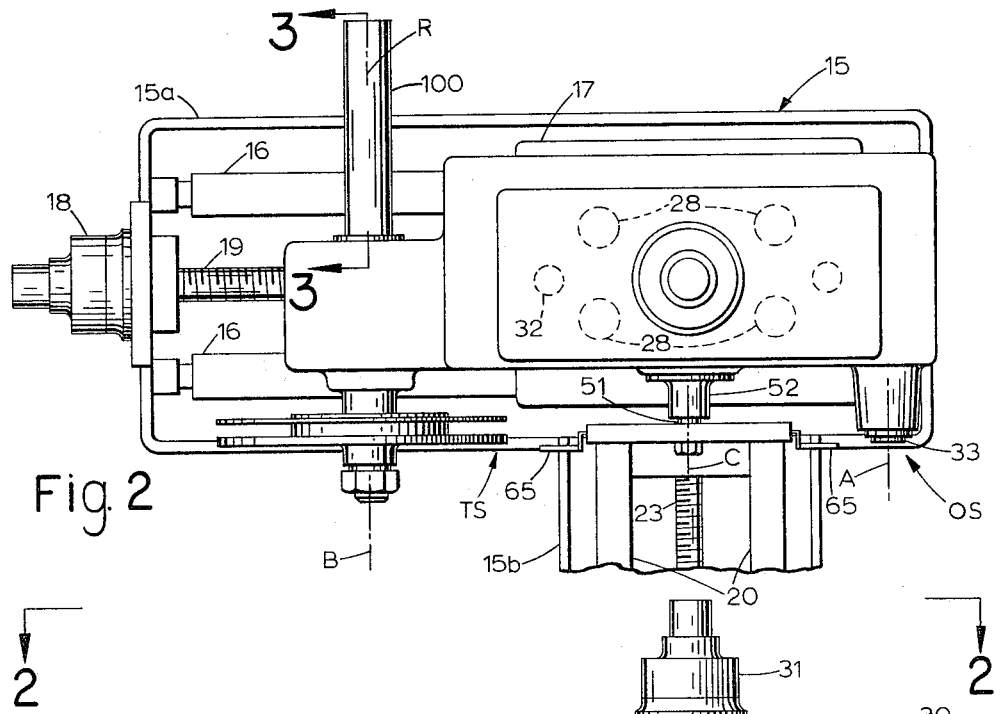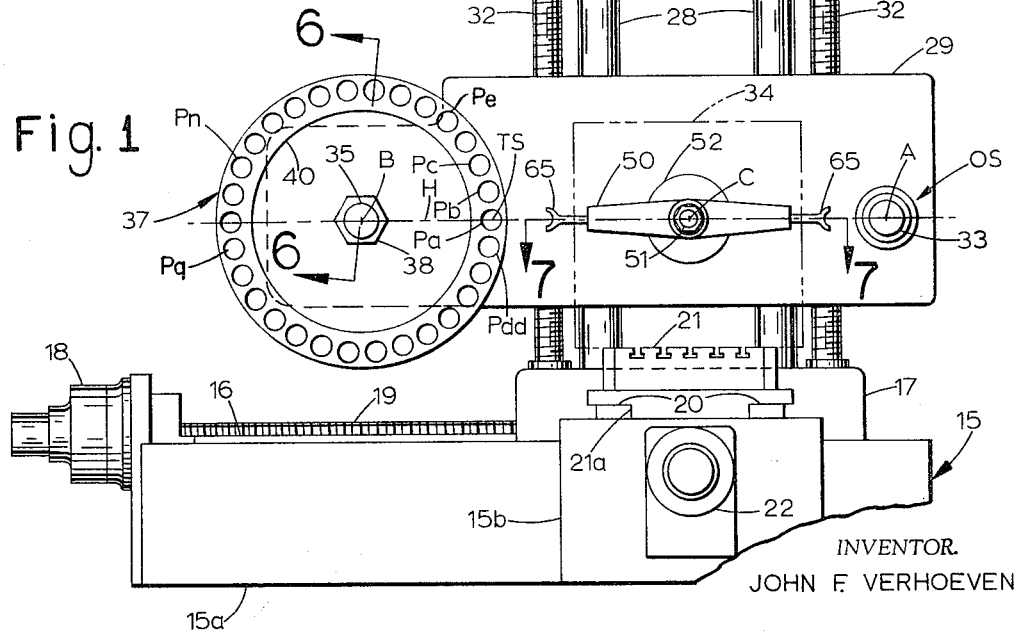

Oct. 11, 1966   J. F. VERHOEVEN   3,277,569
ARTICLE HANDLING AND STORAGE MECHANISM
Filed July 2, 1964   13 Sheets-Sheet 4

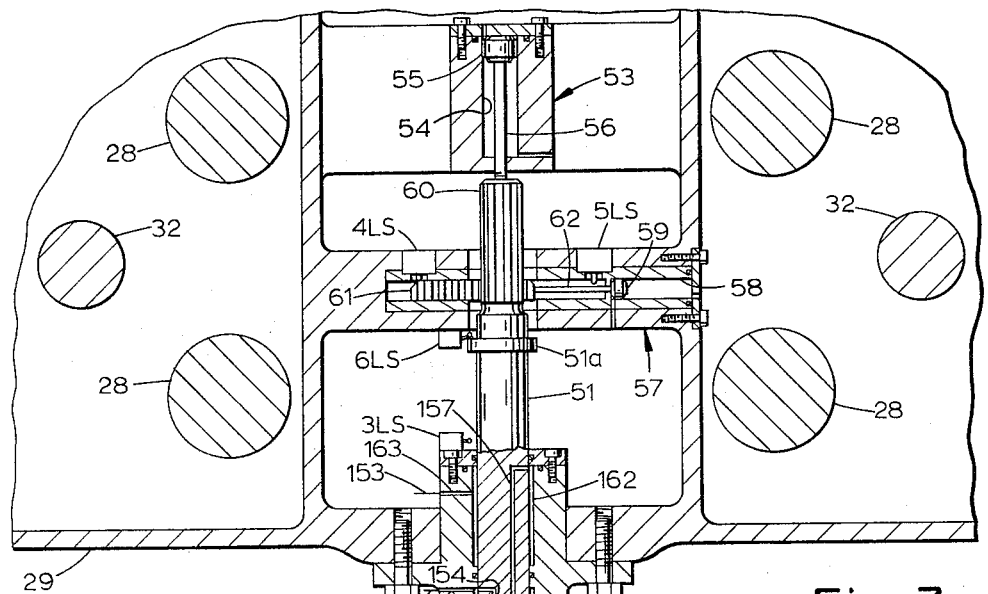
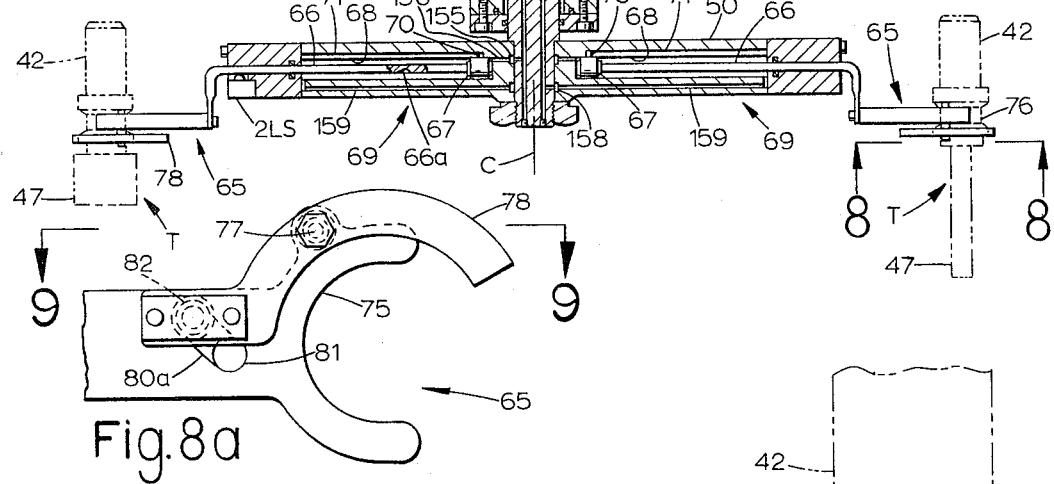
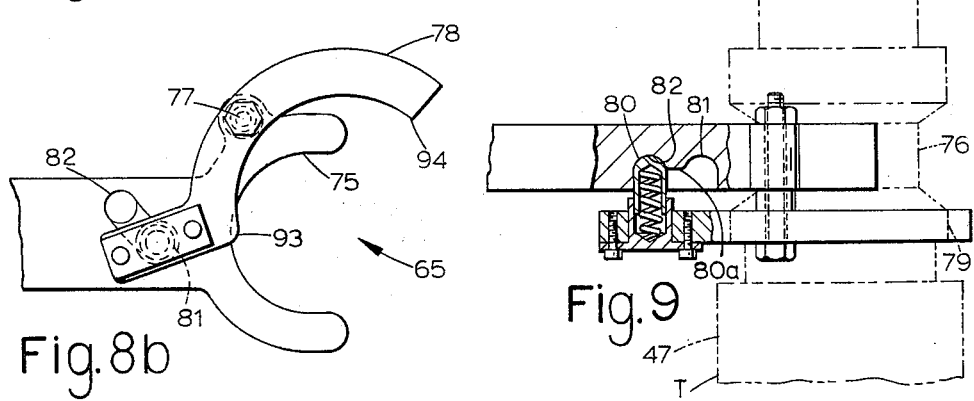

Oct. 11, 1966   J. F. VERHOEVEN   3,277,569
ARTICLE HANDLING AND STORAGE MECHANISM
Filed July 2, 1964   13 Sheets-Sheet 10

United States Patent Office 3,277,569
Patented Oct. 11, 1966

3,277,569
ARTICLE HANDLING AND STORAGE MECHANISM
John F. Verhoeven, Cincinnati, Ohio, assignor to The Cincinnati Milling Machine Co., Cincinnati, Ohio, a corporation of Ohio
Filed July 2, 1964, Ser. No. 379,786
24 Claims. (Cl. 29—568)

The present invention relates to article handling and storage mechanism, and control apparatus therefor, particularly suitable for the automatic controlled handling and storage of a plurality of tools in a general purpose machine tool of the type in which cutting tools are automatically changed to produce a succession of different machining operations on a workpiece.

In machine tools of this type, generally referred to as tool changers, loose tools (that is, tools unconnected to any driving mechanism) are stored in the machine and must be brought to an operating station (such as a spindle connected to driving mechanism) for insertion, one at a time, in the operating station in a predetermined sequence. If each tool stored in the machine is to be used once, and only once, during the operating cycle on each workpiece, the tools can be stored in proper order in the machine tool and fed, one at a time, to the operating station for the successive different machining operations of the operating cycle without the necessity of further selection. The tools can be returned, one at a time, to the storage area in the same sequence in which they are used for storage in their original order. In this type of system, it is the order of storage of the tools which establishes the sequence of use thereof, and mechanism to select tools during the operating cycle is unnecessary.

In general, however, it is desirable that the machine tool have the ability to select tools in a different sequence than the order in which they are stored in the machine. This eliminates the need for arranging the tools in a particular order for a particular operating cycle of successive different machining operations on workpieces, and permits repeated use of the same tool during an operating cycle. In the usual tool changer, the desired sequence of tools is placed on a data input device, such as a device with a punched tape which is fed through the machine to provide a series of instructions for the machine including instructions as to the tools to be brought from the storage area to the operating station. Thus, in tool changers under the control of a tape, the machine will be instructed periodically to select a particular tool from the tools in storage and to move the selected tool from storage to the operating station.

If machine mechanism is to pick a particular tool out of a storage magazine, or drum, the mechanism must know where the particular tool is stored in the drum. This will be known if the particular tool is always stored in a particular pocket in the storage drum. In some machine tools of this type, between cutting operations, transfer mechanism takes the tool from the operating station to its assigned pocket in the drum, the drum rotates to bring the next selected tool to the transfer mechanism, and the transfer mechanism moves the newly selected tool to the operating station. This sequence of events produces an excessive delay between cutting operations.

It has been proposed that an intermediate station be provided between the storage drum and the operating station to which a newly selected tool can be transferred during a cutting operation with a previously selected tool. At the conclusion of the cutting operation, there is a simultaneous exchange of tools between the operating station and the intermediate station. The subsequent transfer of the old tool to the pocket from which it was taken, rotation of the drum to bring the next selected tool to the transfer mechanism, and transfer of the new tool to the intermediate station, all occur during a cutting operation and thus cause no delay. In other words, the intermediate station, since it can accept either a new tool before transfer to the operating station or an old tool after transfer from the operating station, permits the simultaneous transfer of a tool from the intermediate station to the operating station and transfer of a tool from the operating station to the intermediate station so that a cutting operation can begin almost immediately after the previous cutting operation is completed.

In another system used in a tool changing machine, each tool is assigned a different code number and has physically secured thereto code indicia so that, when stored in the drum, each tool appears different to the mechanism (by virtue of the code indicia) than every other tool stored in the drum. Mechanism is provided to sense the code indicia on the tool so that a particular tool can be selected from the drum regardless of the pocket in the drum in which the tool is located. Thus, with this type of tool, it is not necessary that a tool be replaced in the drum storage pocket from which it was removed. The individually coded tools permit a direct and simultaneous exchange of tools between a pocket in the tool drum and the operating station, the tool transferred from the operating station to the drum being deposited, not in the pocket from which it originally came, but in the pocket from which the newly selected tool is taken. The drum is indexed during a cutting operation to bring the next selected tool to the transfer mechanism, and it is therefore possible to begin a cutting operation almost immediately after the previous cutting operation is completed.

In the mechanism of the present invention, a simultaneous transfer of tools, one to the operating station and one from the operating station, is possible (to permit a cutting operation to be begun almost immediately after the previous cutting operation is completed) without providing an intermediate station or without applying code indicia to tools. Any tool may be stored in any pocket in a storage magazine and, although the tools do not bear code indicia, any desired tool can be automatically taken from the drum. This is possible because the mechanism provided in the present invention automatically keeps track of all the tools in the drum regardless of their position in the drum and even though the tools may appear identical to the mechanism.

In the present invention, a position sensor is provided for each tool, each position sensor having a movable follower which is instrumental, when the position sensor is rendered effective, in controlling movement of that tool for transfer thereof to an operating station. In the preferred form of the invention, the follower constitutes a mechanical control element in the form of a switch arm, or finger. While a particular tool is in the storage magazine, the finger therefor moves an amount and in a direction corresponding to the movement of the storage magazine. The storage magazine, which preferably is a circular rotatable drum, moves the tools therein past a transfer station where a tool is removed from the drum for transfer to an operating station (that is, a power driven spindle) and where a tool from the spindle is received back in the drum. Each finger is initially set in accordance with the position of a particular tool in the magazine relative to the transfer station.

When a tape or card data input device calls for a particular tool in the drum, the signal is transmitted to the position sensor for that tool (that is, the position sensor for that tool, alone, is rendered effective) and, if the position of the finger thereof senses that the selected tool is spaced from the transfer station, the drum begins to rotate. All fingers of tools in the drum, including the finger of the tool called for, rotate with the drum and, when the finger of the tool called for reaches a predetermined position (corresponding to the transfer station), the drum stops and the tool called for will have reached the transfer station. Although all fingers "follow" the respective tools in the drum (and hence may be referred to more generally as followers), it is only the position sensor (and the follower thereof) of the selected tool which is effective to exert control over the drum (to stop the drum when the selected tool has reached the transfer station).

The tool at the transfer station is transferred from the drum to the spindle and the tool in the spindle is transferred to the drum, being inserted in the same pocket of the drum from which the tool called for was taken. When the tool called for leaves the drum, the finger thereof is deactivated, thus remaining in the predetermined position corresponding to the transfer station. When the tool from the spindle is inserted in the drum at the transfer station, the finger for that tool (which was previously disabled, or deactivated, at the position corresponding to the transfer station) is reactivated so that, on subsequent rotation of the tool drum, the finger for the returned tool will follow the returned tool (although the returned tool is in a different pocket than the pocket from which it was taken).

Thus, the fingers of all the position sensors follow the respective tools, but only one position sensor (the position sensor of the tool called for) is effective in controlling movement of the drum. The finger of the effective position sensor causes the drum to stop when the finger is in a predetermined position (and the tool called for is in the transfer station). When any tool is taken from the drum at the transfer station, the finger of the position sensor therefor is disabled until the tool is subsequently returned to the drum at the transfer station. Therefore the finger of each position sensor continuously indicates the position of a particular tool, and a signal for that tool will bring the tool to the transfer station (for transfer to the operating position) by making the position sensor for that tool, alone, effective.

In another embodiment of the present invention, the position sensor for each tool does not have a mechanical control element (like a finger, or a switch arm) as a follower, but instead, is a counter or counting ring, in which a current, or electronic charge, constitutes the follower which follows the tool when the tool is in the drum. As with the mechanical position sensor, the follower for a particular tool is disabled when the tool is removed from the drum to wait for the tool to be returned to the drum. When that particular tool is returned to the drum, the follower therefor is reactivated so the electronic charge can again follow the tool.

It is therefore one object of the present invention to provide improved mechanism for the controlled handling of a plurality of articles.

It is another object of the present invention to provide control mechanism which keeps track of a plurality of articles carried by handling mechanism.

It is yet another object of the present invention to provide improved mechanism for the controlled handling of a plurality of tools in tool changer.

It is still another object of the present invention to provide mechanism for presenting a predetermined sequence of tools to an operating station which keeps track of the tools before and after use in the operating station.

It is yet another object of the present invention to provide mechanism for the direct exchange of tools between a storage magazine and an operating station which does not require tools with code indicia thereon or require an intermediate station.

It is still another object of the present invention to provide automatic tool handling and storage mechanism for a tool changer capable of handling tools of identical appearance to the mechanism in which, after use, the tools are returned to different pockets in the storage mechanism than the pockets from which they were taken.

It is yet another object of the present invention to provide tool handling and storage mechanism for a tool changer in which tools without code indicia thereon are automatically taken from the storage magazine as called for despite the fact that the order of the tools in the storage magazine is continuously changing when the machine is in use.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a view in elevation of a general purpose machine tool constructed in accordance with the present invention (shown with the tool drum empty);

FIG. 2 is a plan view taken on the line 2—2 of FIG. 1;

FIG. 3 is a view taken on the line 3—3 of FIG. 2;

Figure 4:
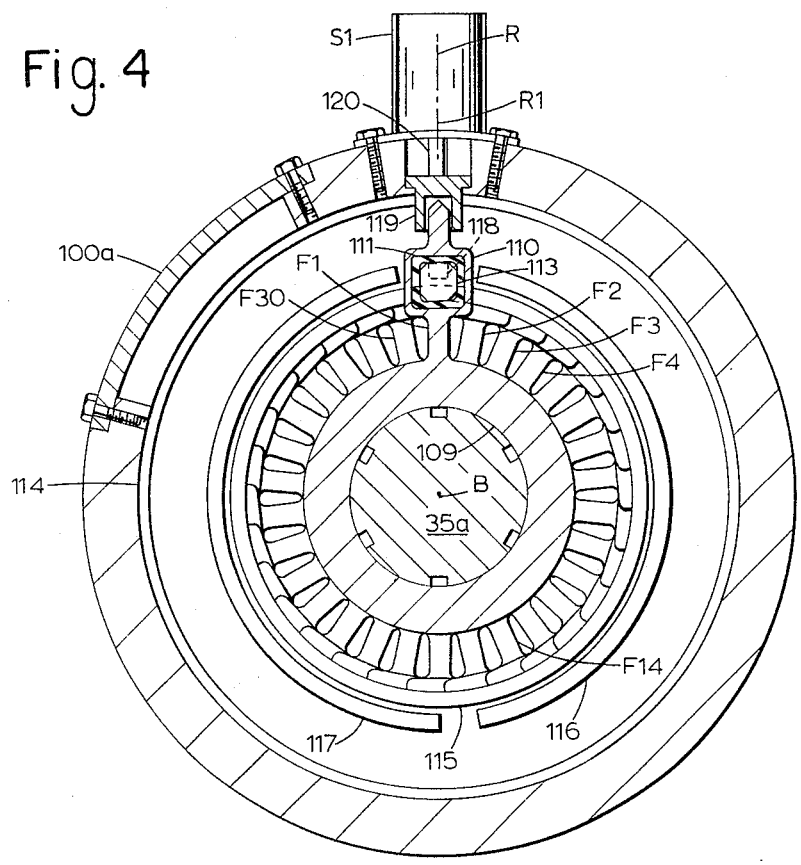
Figure 12C:
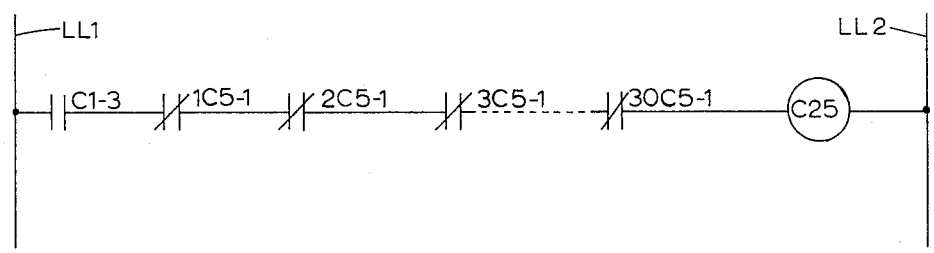
Figure 5:
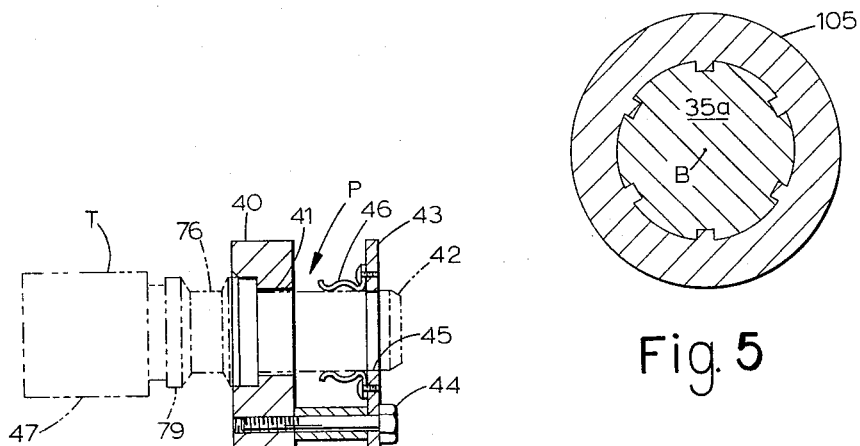
Figure 6:
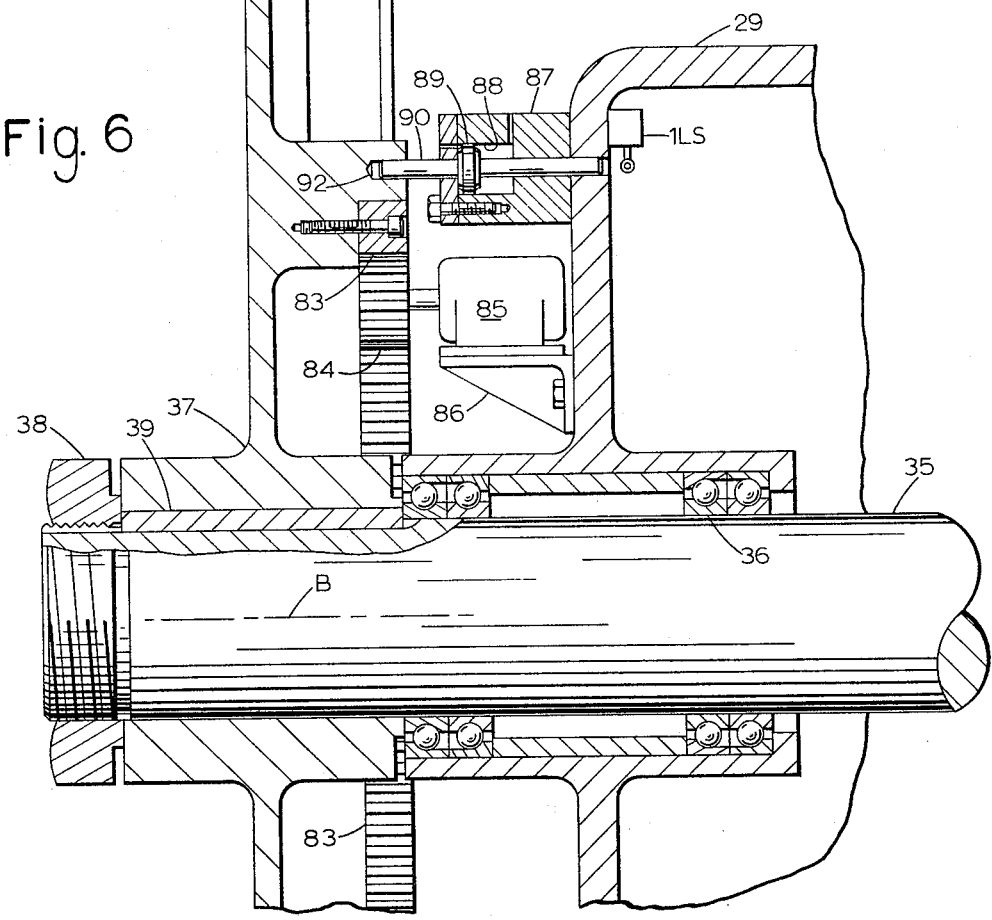
Figure 10:
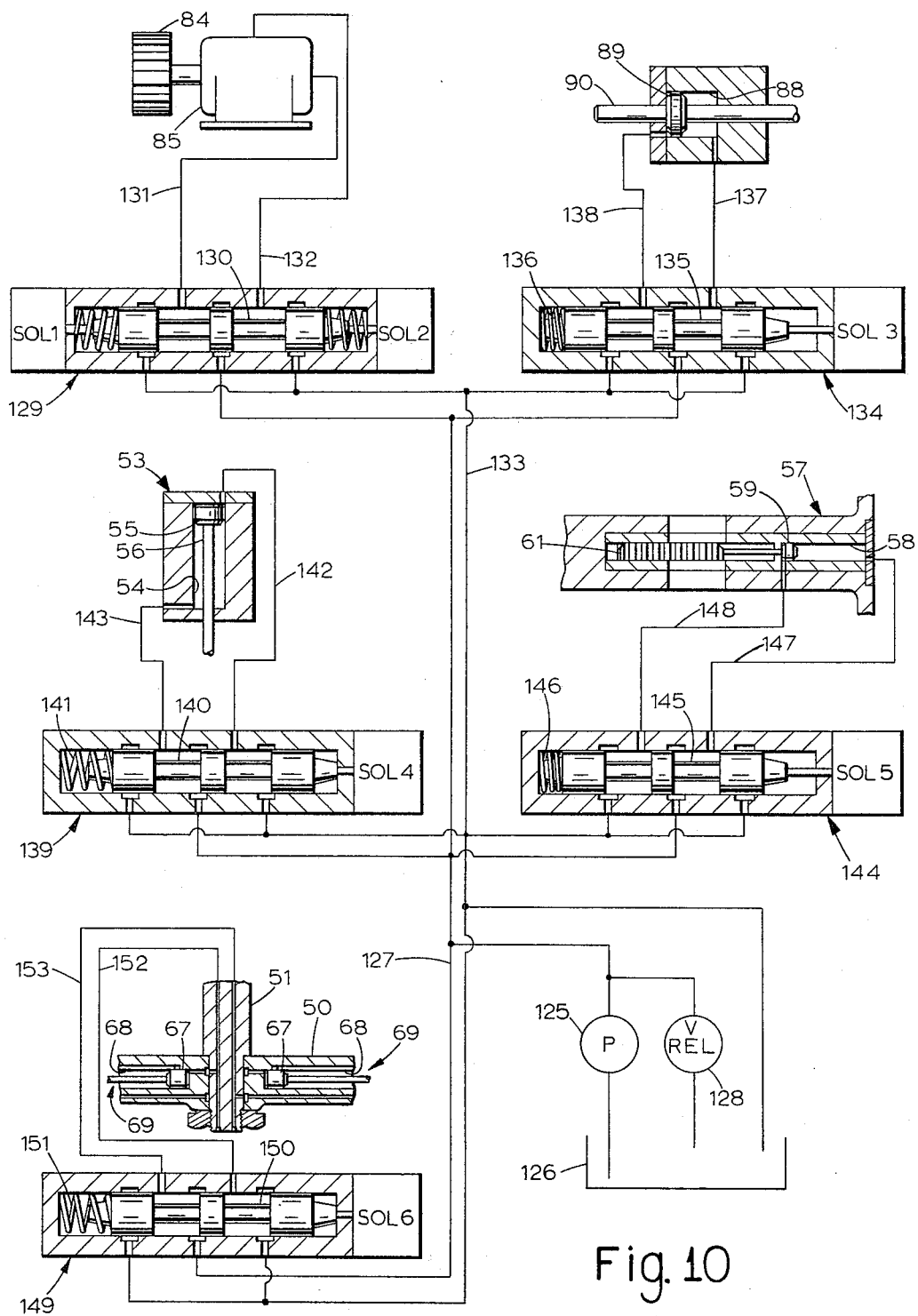
Figure 11:
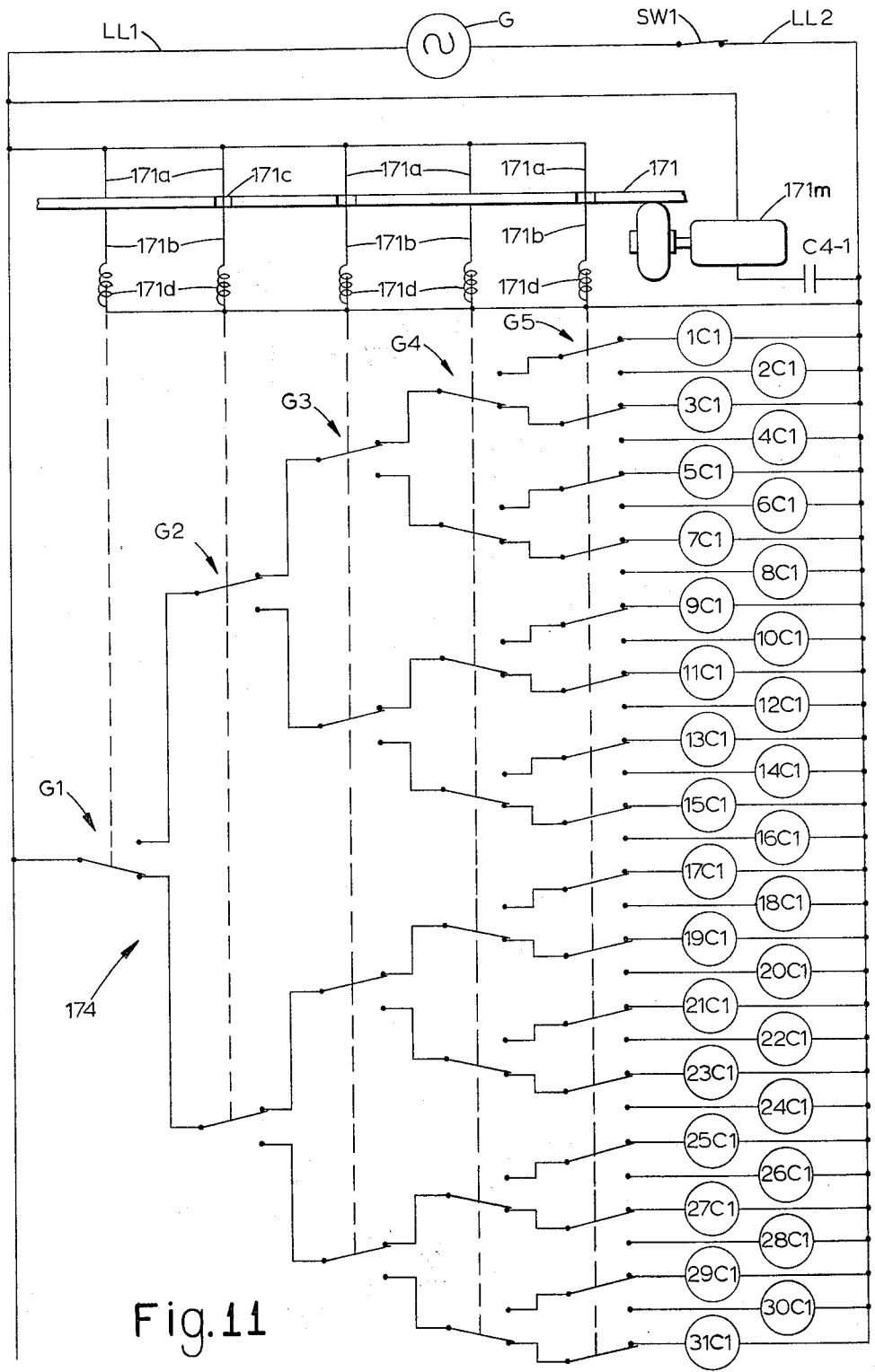
Figure 12A:
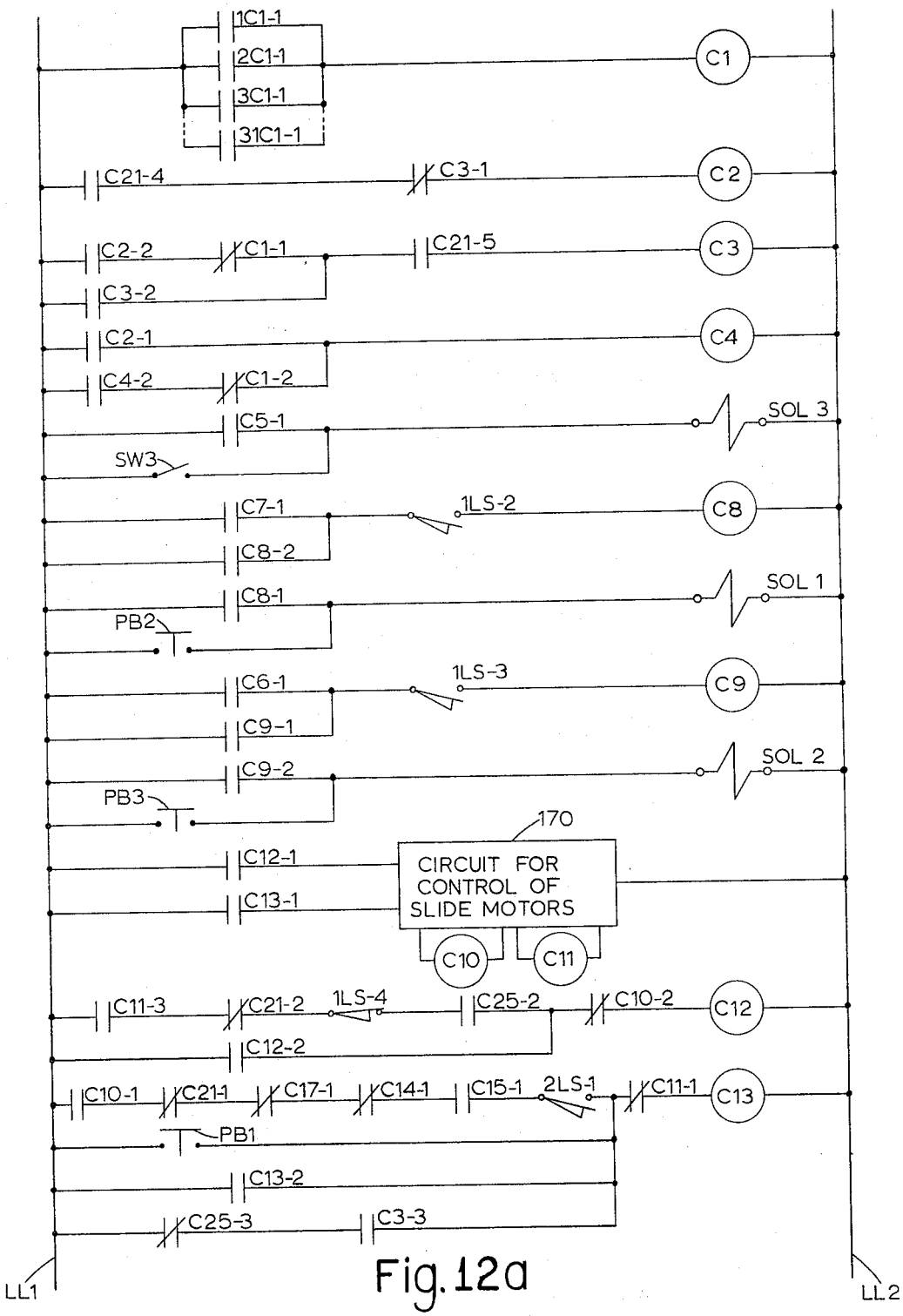
Figure 12B:
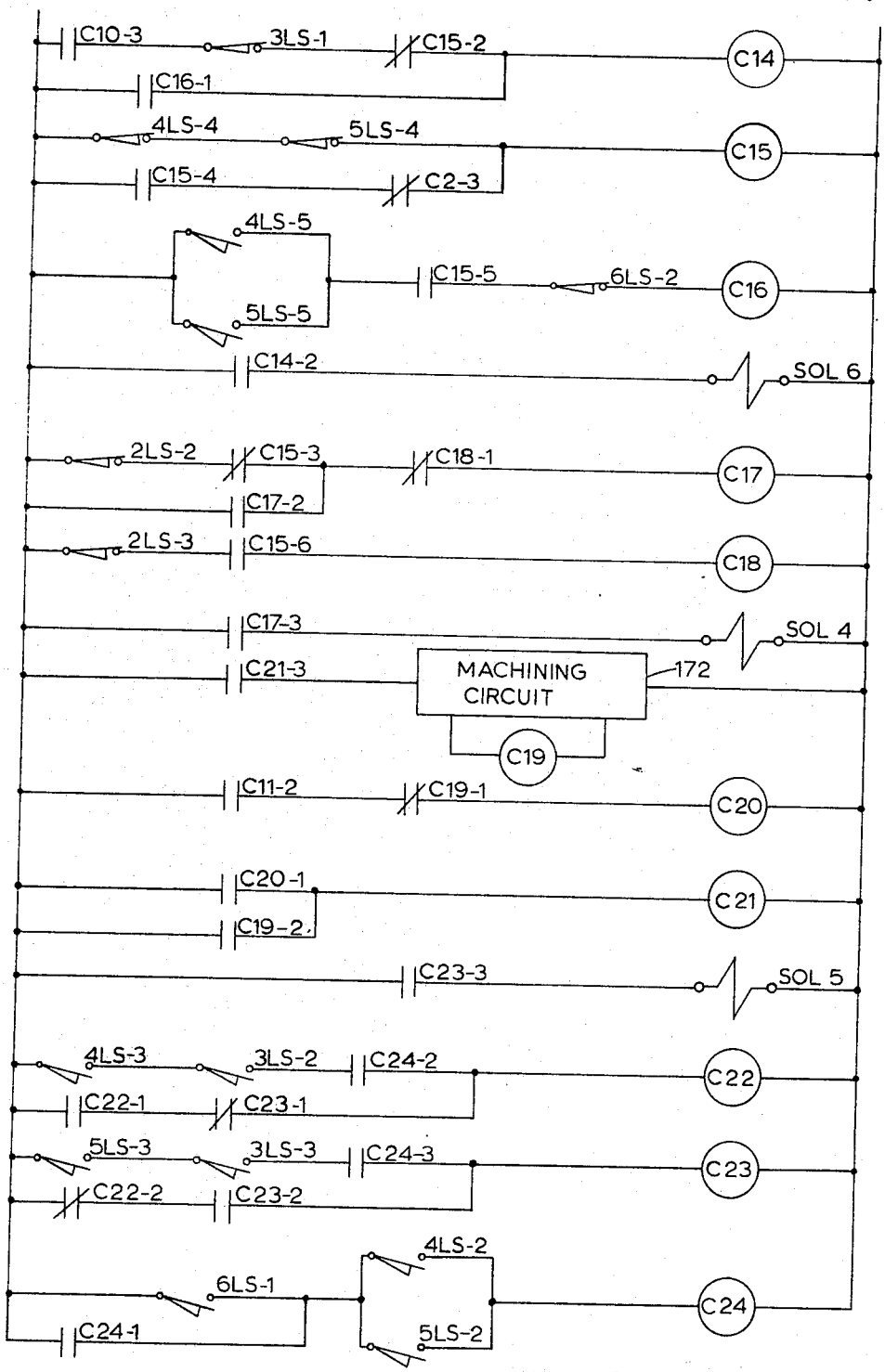
Figure 13:
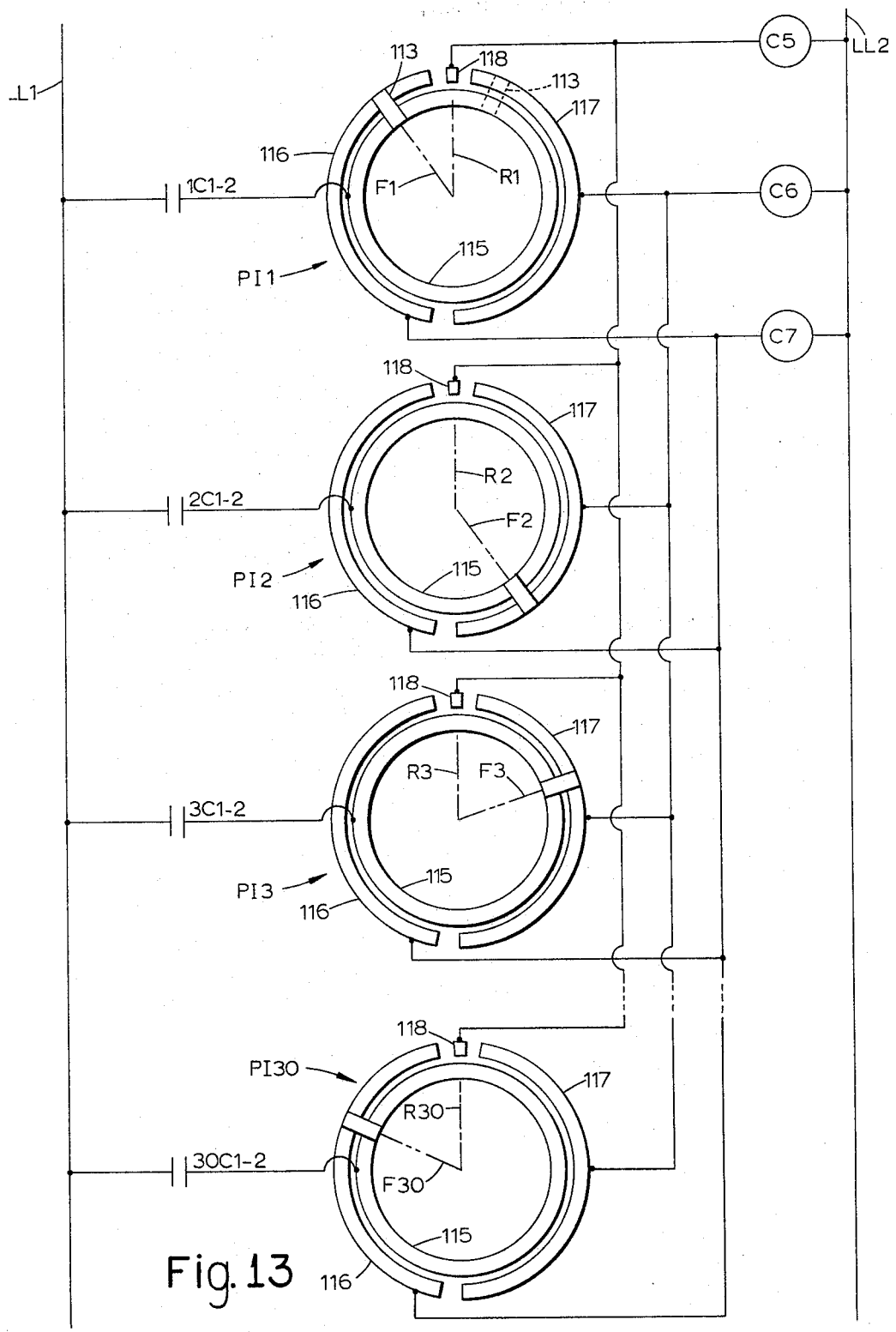
Figure 19:
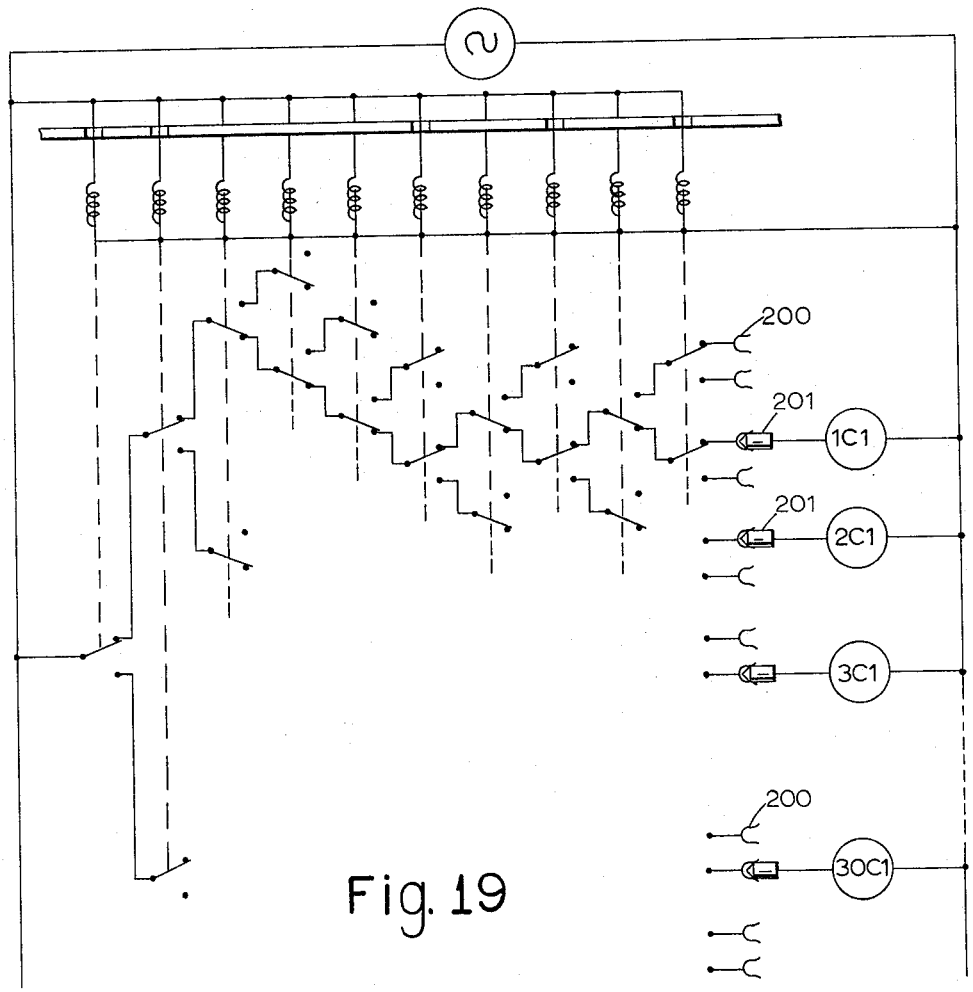
Figure 14:
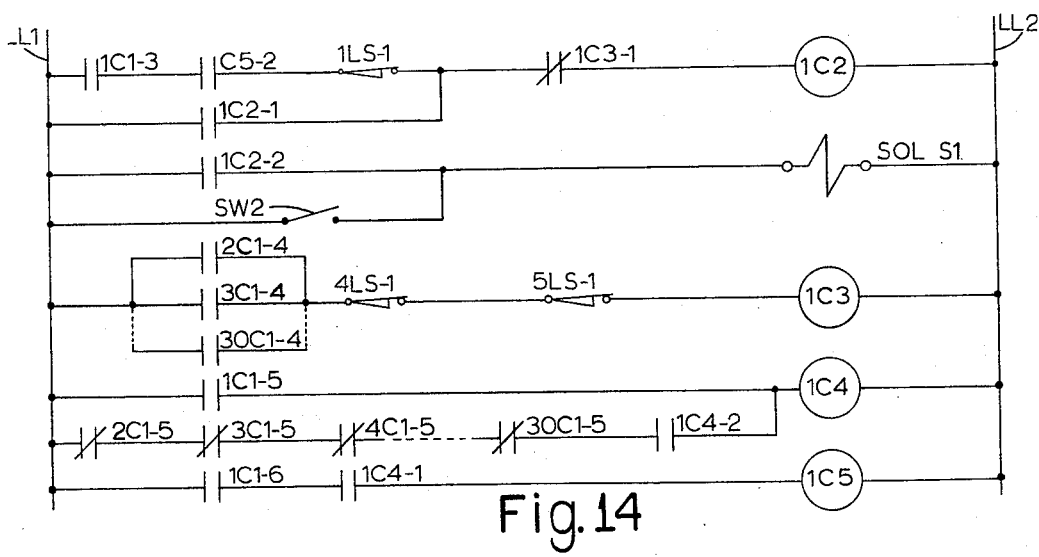
Figure 15:
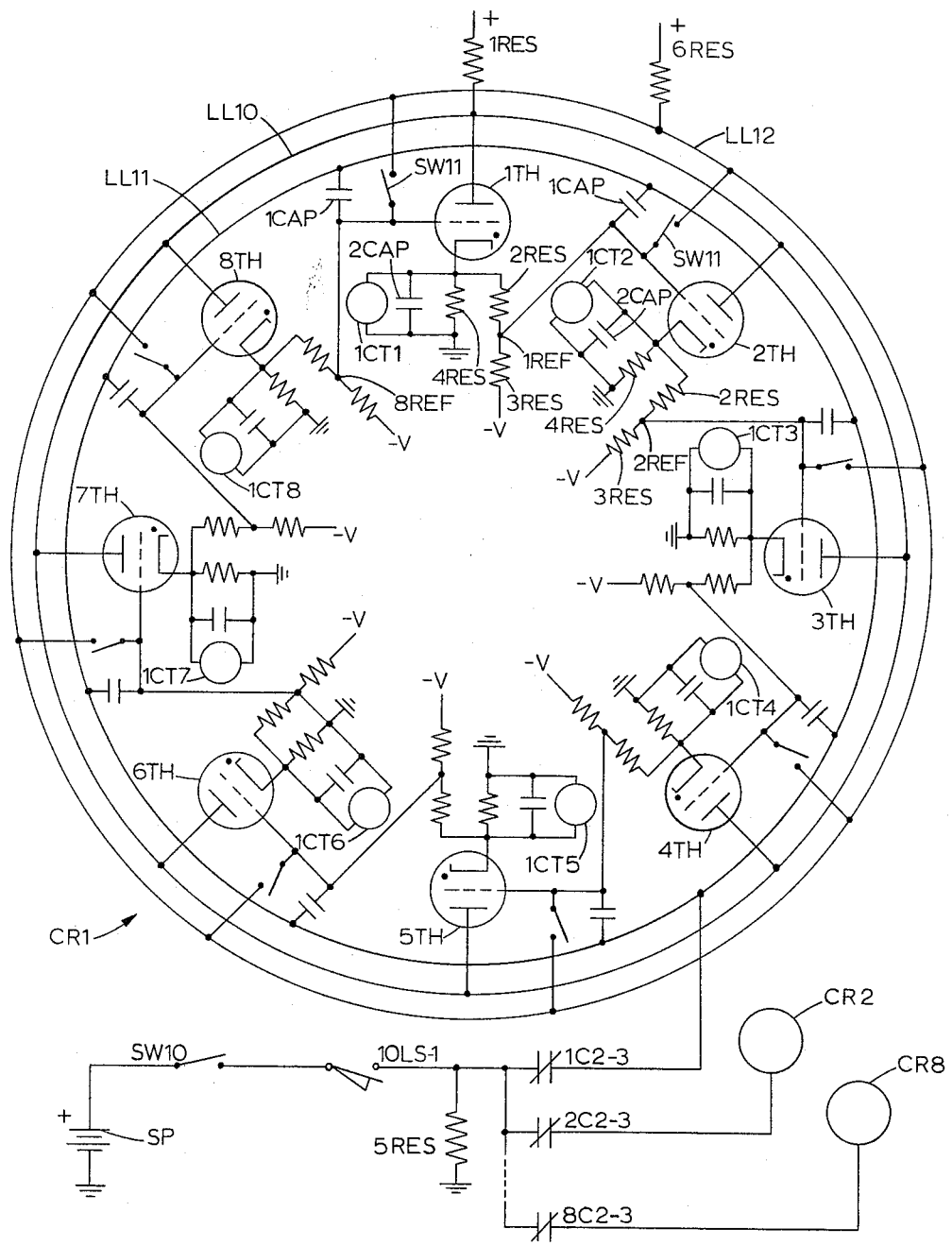
Figure 16:
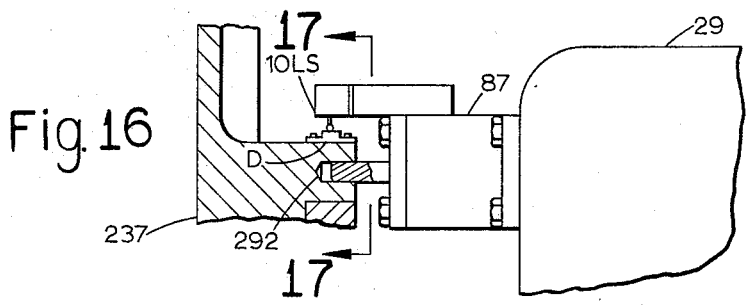
Figure 17:
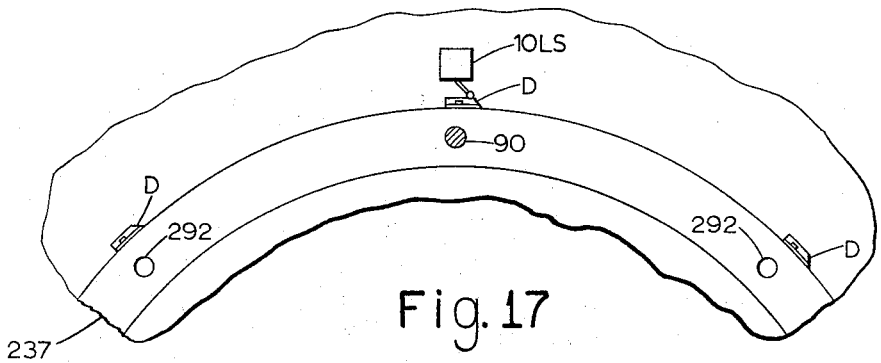
Figure 18:
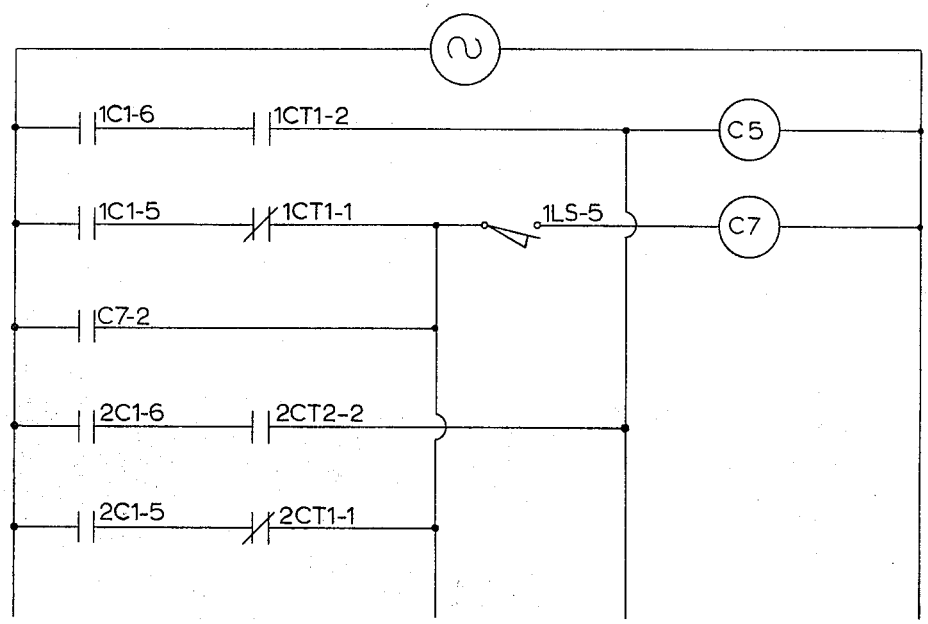

FIGS. 4 and 5 are views taken on the lines 4—4 and 5—5, respectively, of FIG. 3;

FIGS. 6 and 7 are views taken on lines 6—6 and 7—7, respectively, of FIG. 1;

FIGS. 8a and 8b are views taken on the line 8—8 of FIG. 7: FIG. 8a showing the clamp closed to grip a tool FIG. 8b showing the clamp open to release a tool;

FIG. 9 is a view taken on the line 9—9 of FIG. 8a, with a part broken away for clarity;

FIG. 10 is a hydraulic diagram for the tool changing mechanism of the machine;

FIG. 11 is a schematic diagram of a part of the electrical circuit of the machine (showing one embodiment of a tape reader);

FIGS. 12a, 12b, and 12c are schematic diagrams of a part of the electrical circuit of the machine (showing electrical elements used on every tool change cycle);

FIG. 13 is a schematic diagram of a part of the electrical circuit of the machine (showing some of the position sensors for the tools viewed as in FIG. 1);

FIG. 14 is a schematic diagram of a part of the electrical circuit of the machine (showing, for one tool only, circuitry provided for each tool);

FIG. 15 is a schematic diagram of a different embodiment of position sensor (for use in lieu of the position sensors of FIG. 13) and circuitry therefor;

FIG. 16 is a fragmentary view of a tool drum, modified for use in an embodiment of the invention using position sensors as shown in FIG. 15;

FIG. 17 is a view taken on the line 17—17 of FIG. 16;

FIG. 18 is a schematic diagram of a part of the electrical circuit of the machine showing, for two tools only, circuitry provided for each tool, in lieu of the circuitry shown in FIG. 13, when position sensors of the type shown in FIG. 15 are used;

FIG. 19 is a schematic diagram of a part of the electrical circuit of the machine (showing another embodiment of a tape reader for use in lieu of the tape reader of FIG. 11).

There is shown in FIGS. 1 and 2 a general purpose machine tool having a base 15. On one portion 15a of base 15, a pair of straight parallel horizontal ways 16 support a carriage, or first slide, 17 for movement thereon by a rotary motor 18. Motor 18 is connected to a screw 19, which is journaled in the base and threadedly engaged with the carriage. The carriage 17 is moved in one direction on the ways when the screw is rotated by the motor in one direction, and is moved oppositely when the screw is rotated oppositely. On another base portion 15b, which extends perpendicularly to base portion 15a, a pair of straight parallel horizontal ways 20 support a workpiece table, or second slide, 21 for movement thereon by a rotary motor 22. Motor 22 is connected to a screw 23, which is journaled in the base and threadedly engaged with a depending portion 21a of the table. The table 21 is moved toward the base portion 15a when the screw 23 is rotated by motor 22 in one direction, and is moved oppositely away from the base portion 15a when the screw 23 is rotated oppositely.

The carriage 17 has four shafts 28 extending upwardly therefrom which define straight parallel vertical ways for a carrier, or third slide, 29. A head member 30 is secured to the top of the four shafts and supports a rotary motor 31 thereon. The motor 31 is connected, by a gear train (not shown), to two parallel spaced apart vertical screws 32 journaled at the lower end in the carriage 17 and at the upper end in the head member 30. The screws are threadedly engaged with the carrier 29 to raise the carrier 29 on rotation of motor 31 in one direction, and to lower the carrier 29 on opposite rotation of motor 31.

The carrier 29 has a rotatable tool spindle 33 journaled therein on a horizontal axis A which defines an operating station OS to receive tools, one at a time, for successive machining operations on a workpiece. Since the carrier 29 is movable up and down on ways 28, and is movable from left to right as viewed in FIG. 1 with the carriage 17, a tool received in spindle 33 is movable universally in a plane in accordance with the operation of motors 18 and 31. A workpiece 34 mounted on table 21 is movable towards and away from a tool in the spindle in accordance with the operation of motor 22. Accordingly, relative universal movement is attainable between a tool in spindle 33 and the workpiece 34 by virtue of the mutually perpendicular movement of the three slides 17, 21, and 29.

A shaft 35 is mounted on axis B in bearings 36 which are secured in carrier 29, as shown best in FIG. 6. A drum, or magazine, 37 is secured on the forward end of the shaft by nut 38 and is keyed to the shaft at 39. The drum has a rim portion 40 with a plurality of equally angularly spaced identical holes 41 therein, each adapted to receive a tool T therein. An annular support ring 43 is mounted in spaced relation to the rim 40 by screws 44. The ring 43 has a plurality of holes 45, each in registration with one of the holes 41 in the rim, to support the rear end of the shank 42 of a tool received in the rim 40. Each set of aligned holes 41, 45 defines a drum pocket P for a tool, and a pair of spring clips 46 connected to the support ring 43 straddle each pocket to hold a tool therein. Although all the tools T are different, for different machining operations on the workpiece, the shanks 42 of the tools are all identical and each tool will fit in any pocket P. In other words, although the cutting ends 47 of the tools are different, none of the tools have any code indicia secured thereto and all the tools appear identical to the drum and other mechanism of the machine.

The center of a transfer arm 50 is secured to a shaft 51 which is received, on axis C, in a hub 52 secured in carrier 29, as shown best in FIG. 7. The shaft 51 is axially shiftable in hub 52 by an axial motor 53 defined by a cylinder 54 in carriage 29 and a piston 55 which is received in cylinder 54. Piston 55 is connected to shaft 51 through connecting rod 56 to advance the shaft 51 (and arm 50) when the piston 55 is advanced in the cylinder, and to retract the shaft 51 (and arm 50) when the piston 55 is retracted in the cylinder 54 (as shown in FIG. 7). The shaft 51 is also rotatable in the hub 52. The rotation of shaft 51 is effected by a rotation motor 57 comprising a cylinder 58 in the carrier 29 and a piston 59 received in the cylinder. The shaft 51 has an elongated gear 60 thereon which is engaged by a rack 61 in any axial position of the shaft 51. The rack 61 is connected to piston 59 by connecting rod 62. When the piston 59 and rack 61 move from their extreme right hand position to their extreme left hand position (as viewed in FIG. 7), the arm 50 rotates about axis C 180 degrees clockwise, as viewed in FIG. 1. When the piston 59 and rack 61 move from their extreme left hand position to their extreme right hand position (as viewed in FIG. 7), the arm 50 rotates about axis C 180 degrees counterclockwise, as viewed in FIG. 1.

The arm 50 carries, at each end, a tool clamp 65, as shown in FIG. 7. Each tool clamp is secured to a rod 66 which is connected to a piston 67 slidably received in a cylinder 68 in the arm 50. Thus, the pistons 67 and cylinders 68 define two radial motors 69 (one on each side of axis C) operating to radially extend the tool clamps when the pistons 67 move to the outer end of cylinders 68 and operating to radially retract the tool clamps when the pistons 67 move to the inner end of cylinders 68. Each piston 67 has a pin 70 which extends into a longitudinal slot 71 in cylinder 68 to prevent rotation of the piston 67 and the rod 66.

When the rotation motor 57 is in one extreme position or the other (that is, with piston 59 thereof at the inner or outer end of cylinder 58) the arm 50 will be horizontal, as shown in FIG. 1, and lying on the horizontal line H passing through the axis of rotation B of the drum 37 and the axis A of the spindle 33. With the radial motors 69 retracted (that is, with the pistons 67 thereof at the inner end of cylinders 68) the left tool clamp 65 (as viewed in FIG. 1) will be aligned with, but spaced from, a tool in a transfer station TS, and the right tool clamp 65 will be aligned with, but spaced from, a tool in the spindle 33. The transfer station TS is defined as the position (fixed with respect to carrier 29 and axis B therein) of a tool in the pocket of the drum, when the drum is stopped, lying on the horizontal line H closest to the spindle 33 (that is, the position of a tool in the right hand horizontal pocket, or the pocket at three o'clock, as the drum is viewed in FIG. 1).

Each tool clamp 65 (as shown in FIGS. 8a and 8b) terminates in a semi-circular opening 75 which fits a groove 76 in the forward end of the tool shank 42 (see FIGS. 6, 7 and 9). Each tool clamp has pivotally connected thereto, at 77, a curved finger 78 which, when a tool is received in the tool clamp, embraces a flange 79 on the tool shank 42 just forward (toward the cutting end 47 of the tool) of the groove 76 to hold the tool in the tool clamp. The finger 78 has a spring urged detent 80 therein, received in groove 80a, as shown best in FIG. 9, and the detent 80 engages a pocket 81 at one end of groove 80a to hold the finger open for receiving a tool as shown in FIG. 8b, and the detent 80 engages a pocket 82 at the other end of groove 80a to hold the finger closed for gripping a tool in the clamp, as shown in FIG. 8a.

As shown best in FIG. 6, the drum 37 has a ring gear 83 secured thereto which is engaged by a pinion 84 mounted on the shaft of rotary hydraulic motor 85. The motor 85 is mounted on a bracket 86 connected to carrier 29. A block 87 is also mounted on the carrier 29 and has a cylinder 88 therein. A piston 89 in cylinder 88 operates to shift a plunger 90 into and out of the holes 92 in drum 37. The holes 92 are equally angularly spaced around the drum, one for each tool pocket. Rotation of hydraulic motor 85 in one direction will rotate the drum in one direction, and rotation of the motor oppositely will rotate the drum in the opposite direction. The holes 92 are positioned to stop a selected tool in the transfer station TS.

During machining of the workpiece 34 by the tool in spindle 33, the drum 37 is rotated to bring the next desired tool into the transfer station TS. At this time, the arm 50 is in the horizontal position shown in FIG. 1, is axially retracted as shown in FIGS. 2 and 7, and the tool clamps 65 are empty (FIG. 8b), and radially retracted as shown in FIG. 7. After the machining operation with the tool in the spindle is completed, the table 21 is moved away from the carriage 29 and the tool clamps are moved radially outwardly by motors 69. Before the two clamps engage, respectively, the tools in the transfer station and the spindle, the finger 78 of each clamp will be in the open position shown in FIG. 8b. As the clamps approach the tools, the flange 79 of the tools (see FIGS. 6 and 9) will engage the butt end 93 of the fingers 78, swinging the fingers down over the flanges 79 of the tools. Axial advance of shaft 51 by motor 53 after the tools are gripped will pull the tools from the drum and spindle, respectively. Radial retraction of the clamps clears the tool from the transfer station for rotation of the arm 50 180 degrees by operation of motor 57. Reverse operation of motors 69 to extend the clamp members 65, and reverse operation of motor 53 to axially retract shaft 51, inserts the tools into the spindle and drum respectively. It should be noted that conventional spindle mechanism, comprising a power operated spindle draw bar (as shown,, for example, in FIG. 10-9 on page 288 of Numerical Control in Manufacturing, published by McGraw-Hill Book Company, Inc. 1963), is used to lock and unlock the tool in the spindle. After the tools are inserted in the drum and spindle, the motors 69 are operated to retract the clamps and, as this is done, the tip 94 of each finger 78 is urged upwardly by tool flange 79 to return the clamps to the open condition shown in FIG. 8b, ready for the receipt of tools.

When the clamps 65 grasp tools at the spindle and the transfer station, respectively, and the arm 50 is subsequently rotated 180 degrees, a direct exchange between the tool in the spindle and the tool in the particular drum pocket at the transfer station is effected. Although all the tools have been designated in general as T, they are all in fact different tools and, although not all shown in the drawings, will be distinguished in the description by different numerical suffixes when necessary to describe the mechanism disclosed herein. Unlike the tools, the pockets P are all identical but will be distinguished in the description, for purposes of explanation, by letter suffixes. If, for example, a machining operation with tool T19 has just been completed and the next machining operation is to be performed with tool T8, the pocket (say pocket Pe) with tool T8 will be at the transfer station. After the direct exchange of tools effected by transfer arm 50, tool T19 will be in pocket Pe and tool T8 will be in the spindle 33. In the next direct exchange of tools, tool T25, for example, from pocket Pq, say, might be transferred to the spindle and tool T8 transferred to pocket Pq. In other words, after each machining operation, the previously used tool is stored in the pocket from which the next tool to be used is taken. Thus, at any time, there is no predetermined unchanging arrangement of the tools in the drum. Instead, with each machining operation, the order of the tools in the drum changes. Since, to repeat the operating cycle on a plurality of like workpieces successively, it is necessary to use the same series of tools on each workpiece, it is necessary that previously used tools, regardless of the current pocket in which they are stored, can be brought to the transfer station.

A control system with control mechanism for each tool is provided which automatically keeps track of the tools in the drum and responds to input signals calling for a specific tool to put the tool called for into the transfer station, regardless of the pocket in which the tool is stored, for subsequent transfer to the tool spindle.

The shaft 35, which is keyed to the drum 37, is rotated in the carrier 29 by rotation of the drum, which is rotated by hydraulic motor 85. The shaft 35, as shown best in FIG. 3, extends through the carrier 29 and rearwardly therefrom. The portion 35a of shaft 35 behind the carrier is substantially reduced in diameter. A casing 100, having a removable door 100a (FIG. 4), is secured to carrier 29 and has a rear cover 101 with an opening 102 therein. A bushing 103 is splined to shaft 35a, for rotation therewith, and is rotatably received in opening 102. A collar 104 is secured to shaft 35a outboard of the bushing 103.

Within the casing 100 there is provided a plurality of control mechanisms, or position sensors (indicated generally as PI), one for each tool stored in the drum. Each position sensor, which has movable and stationary control elements, serves to sense continuously the position of a particular tool in the drum and, more specifically, the position of that tool in the drum with respect to the transfer station. Each position sensor PI (which bears the same numerical suffix as the tool the position of which is sensed by that particular position sensor) has a finger F (with the same numerical suffix as the position sensor) which defines the movable control element of the position sensor. The fingers F each extend radially from a different hub 109, one finger to a hub, as shown best in FIG. 4. The hubs 109 are mounted within casing 100 and on shaft 35a. Interspersed between the hubs 109 are annular spacers 105. The spacers and hubs are mounted alternately on shaft 35a and are sandwiched between the carrier 29 and a washer 106 which is urged toward the carrier 29 by the spring 107 (mounted on shaft 35a between washer 106 and bushing 103). As shown in FIG. 5, the spacers 105 are in splined engagement with shaft 35a and must rotate with the shaft. As shown in FIG. 4, the hubs 109 are not in splined engagement with the shaft 35a, but, because spring 107 urges the spacers and hubs together, the hubs (and hence the control element fingers) will rotate with the shaft 35a unless restrained. As shown best in FIG. 4, the finger (such as F1) extending radially from each hub 109 has a boss 110 with an insulated casing 111 secured therein. As shown best in FIG. 3, a spring 112 and a current conducting brush 113 are received in each casing 111.

As shown in FIGS. 3 and 4, there is secured inside the casing 100 annular ribs 114, one extending around every other spacer 105. On each radially extending face of the rib (that is, on the forward face 114a and on the rear face 114b of each rib) there is secured a plurality of conductors (defining stationary control elements of a position sensor) as shown best in FIG. 4. On each face of each rib, these conductors comprise an inner circular conductor 115, and two substantially semi-circular conductors 116, 117 concentric with and in closely spaced relation to the inner conductor. A fixed radial vertical plane R (containing the axis B) has therein, at each position sensor, a radial line R (with the same numerical suffix as the position sensor), and on this line (R1 in FIG. 4) there is a short conductor 118 spaced from and lying between the ends of outer conductors 116 and 117. The conductors 116, 117, and 118 lie on a common circle, which is outside the circle of inner conductor 115. In any position of the finger (as F1 in FIG. 4) the brush 113 thereof (which is urged against the conductors by spring 112) is engaged with the inner conductor 115 and, simultaneously, one of the outer conductors 116, 117, 118.

Each position sensor includes a solenoid actuated stop, indicated generally as S (with a numerical suffix the same as the numerical suffix of the position sensor). Each stop is mounted on the casing 100 in the radial plane R (and on the radial line therein, as stop S1 is on radial line R1). Thus, in the machine illustrated, all stops lie in a straight line on top of the casing 100 as shown in FIG. 3. Each stop has a cup 119 on the end of plunger 120. When the solenoid of the stop is energized, the plunger is shifted downwardly and the cup extends through the casing wall to embrace a finger F lying on the radial line (as cup 119 of position sensor PI1 embraces finger F1 which is on the line R1 when in the position shown in FIGS. 3 and 4). With the stop S1 restraining the finger F1 as shown in FIGS. 3 and 4, subsequent rotation of shaft 35a will not swing the finger from the radial line R1. When, however, the solenoid of the stop S1 is deenergized and the plunger 120 and cup 119 raised (by a spring, not shown), the finger F1 will again rotate with rotation of shaft 35a. Since there is a stop S in each position sensor, the rotation of the fingers thereof for particular tools can be stopped, or deactivated, by energizing the stops in registration with the particular fingers.

The rotation of the drum 37 to bring a tool to the transfer station, and operation of arm 50 to effect a direct and simultaneous exchange of the tool in the drum at the transfer station and the tool in the spindle at the operating station OS defined by the spindle 33 (which is fixed relative to carrier 29 and drum 37), will best be understood by reference to FIGS. 6, 7, and 10. There is shown in FIG. 10 a hydraulic pump 125 which takes fluid from sump 126 and delivers it under pressure to pressure line 127. A safety relief valve 128 is connected between pressure line 127 and sump 126 to limit the pressure in line 127. A drum control valve 129 has a spring centered valve plunger 130 and a solenoid connected to each end thereof: the solenoid SOL1 shifting the valve plunger 130 to the right when energized and the solenoid SOL2 shifting the valve plunger 130 to the left when energized. When solenoid SOL1 is energized (and solenoid SOL2 deenergized) fluid from pressure line 127 passes through valve 129 to motor line 131 of the drum motor 85. At this time motor line 132 of the drum motor is connected through valve 129 to a return line 133. Conversely, if solenoid SOL2 is energized (and solenoid SOL1 deenergized) fluid from pressure line 127 passes through valve 129 to motor line 132, and fluid from motor line 131 passes through the valve 129 to return line 133. When solenoid SOL1 is energized, drum motor 85 rotates the drum clockwise, as viewed in FIG. 1, and when solenoid SOL2 is energized, drum motor 85 rotates the drum counterclockwise.

Valve 134 has a valve member 135 which is shifted to the left, against the bias of spring 136, when the solenoid SOL3 is energized. When valve member 135 is to the left, as shown, pressure line 127 is connected to motor line 137 through the valve, and motor line 138 is connected through the valve to return line 133. The motor lines 137 and 138 are connected to the ends of cylinder 88 and, with these pressure conditions impressed across cylinder 88, the plunger 90 will be advanced to lock the drum. When this occurs, limit switch 1LS, connected to carrier 29 (see FIG. 6), will be unoperated. When solenoid SOL3 is deenergized and valve member 135 is held to the right by spring 136, pressure line 127 is connected through valve 134 to motor line 138, and motor line 137 is connected through the valve to return line 133. With these pressure conditions impressed across cylinder 88, plunger 90 is retracted from locking engagement with the drum 37 and limit switch 1LS is operated.

Control of motor 53 to control the axial movement of shaft 51 (and arm 50) is effected by valve 139. Valve 139 has a valve member 140 which is shifted to the left against the bias of spring 141 when the solenoid SOL4 is energized. With valve member 140 to the left, pressure line 127 is connected through the valve to motor line 142, and motor line 143 is connected through the valve to return line 133. Under these pressure conditions, piston 55 is advanced in cylinder 54 and shaft 51 (and arm 50) are advanced. With shaft 51 advanced, collar 51a on shaft 51 operates limit switch 3LS (FIG. 7). When the solenoid SOL4 is deenergized and valve member 140 is shifted to the right by spring 141, pressure line 127 is connected through the valve to motor line 143, and return line 133 is connected through the valve to motor line 142. With these pressure conditions, piston 55 is retracted in cylinder 54 and shaft 51 (and arm 50) are retracted. With shaft 51 retracted, collar 51a operates limit switch 6LS (FIG. 7).

Valve 144 controls the motor 57 which rotates shaft 51 (and arm 50). Valve 144 has a valve member 145 which is shifted to the left against the bias of spring 146 by energization of solenoid SOL5. When valve member 145 is to the left, pressure line 127 is connected through the valve to motor line 147, and motor line 148 is connected through the valve to return line 133. Under these pressure conditions, piston 59 and rack 61 are shifted to the left, operating limit switch 4LS (FIG. 7). When solenoid SOL5 is deenergized and valve member 145 is shifted to the right by spring 146, pressure line 127 is connected through the valve to motor line 148, and return line 147 is connected through the valve to return line 133. Under these pressure conditions, piston 59 and rack 61 are shifted to the right and limit switch 5LS (FIG. 7) is operated. When piston 59 and rack 61 are between their extreme positions, both limit switches 4LS and 5LS are unoperated.

Valve 149 controls the radial extension and retraction of the tool clamps 65 by the motors 69. The valve 149 has a valve member 150 which is shifted to the left against the bias of spring 151 when the solenoid SOL6 is energized. When the valve member 150 is to the left, pressure line 127 is connected through the valve to motor line 152, and motor line 153 is connected through the valve to return line 133. The shaft 51 (see FIG. 7) has two passages extending therethrough: passage 154 which is continuously connected to the inner end of both cylinders 68 through annular groove 155 and radial passages 156, and passage 157 which is continuously connected to the outer end of cylinders 68 through annular groove 158 and radial passages 159. The hub 52 has an annular passage 160 which is in continuous communication with shaft passage 154 in any axial or angular position of shaft 51. Passage 160 connects to a radial passage 161 in hub 52 which connects to motor line 152. Similarly, the hub 52 has an annular passage 162 which is in continuous communication with shaft passage 157 in any axial or angular position of shaft 51. Passage 162 connects to a radial passage 163 in hub 52 which connects to motor line 153. With pressure line 127 connected to motor line 152 and motor line 153 connected to return line 133 on energization of solenoid SOL6, the pistons 67 are in the outer ends of cylinders 68, the clamps 65 are extended, and limit switch 2LS (FIG. 7) which is in registration with rod pocket 66a, is released. When the solenoid SOL6 is deenergized and valve member 150 is shifted to the right by spring 151, pressure line 127 is connected to motor line 153, and motor line 152 is connected to return line 133. Under these pressure conditions, the pistons 67 are at the inner ends of cylinders 68, the tool clamps 65 are retracted, and limit switch 2LS is operated.

In order to set up the machine for operation, all of the stops S are extended by energizing the solenoids thereof and the drum motor 85 is operated to rotate the drum (say clockwise as viewed in FIG. 1). This is done with the door 100a removed and if any fingers F are embraced by particular stops S, the solenoids for those stops are momentarily deenergized to raise the plunger 120 and release the trapped finger. Thus, in a few seconds, all the fingers will be engaged with the right edge (as viewed in FIG. 4) of the respective cups 119. At this time, the drum motor is stopped and all stops S are deenergized to raise all the cups 119. The drum motor is then momentarily operated to rotate the drum a few degrees clockwise, as viewed in FIG. 1 (counterclockwise as viewed in FIG. 4), bringing all the fingers into plane R and directly under the cups 119. All stops are then actuated so that all fingers are locked in the plane R, and the drum lock is actuated to lock the drum in this position. One pocket of the drum will be at the transfer station since the number of locking holes 92 equal the number of pockets P and since the holes are positioned so that a pocket P will be at the transfer station on line H whenever the drum is locked.

It should be noted that the tools initially need not be in any particular order in the drum. It is only necessary that the finger for a particular tool be positioned relative to the plane R to correspond to the position of the tool in the drum relative to the transfer station TS. Although the tools need not be initially placed in the drum in any particular order, the tools cannot be arbitrarily shifted from drum pocket to drum pocket by the operator after set up, if the proper tools are to be selected. However, the tools can be, and are, shifted from one drum pocket to the spindle and back to another drum pocket automatically by the tool handling mechanism without impairing the future selection of the proper tools. Although there is no initial predetermined order for the tools, it is believed that understanding of the present invention will be facilitated by assuming the tool T1 is initially at the transfer station in drum pocket Pa, and that the tools are placed in the drum in numerical order in a counterclockwise direction (as viewed in FIG. 1) from the transfer station so that tool T2 is in pocket Pb, tool T3 in pocket Pc and tool T30 in pocket Pdd. To continue the set up of the machine, the mechanical control element, or finger, F1 for the tool (T1) in the pocket (Pa) at the transfer station is released (by deenergizing the solenoid for stop S1) and the drum is rotated clockwise until the next pocket Pb (with tool T2 therein) swings into the transfer station. The drum is locked and the finger F2 for the tool T2 in the transfer station is released by deenergizing the solenoid for stop S2 so that cup 119 thereof lifts off finger F2.

As the drum is stepped clockwise (as viewed in FIG. 1) in increments, the pockets are swung successively in order into the transfer station, and the fingers for the tools in the pockets are released when the pockets reach the transfer station. After all the pockets have been swung through the transfer station, all the fingers for the tools will be angularly positioned with respect to plane R similarly to the position of the respective tools relative to transfer station TS, as shown in FIGS. 3 and 4. In other words, each finger (as, say, F14, for example) is the same angular distance and in the same direction from line R14 as the tool T14 is from the transfer station TS. With 30 pockets in the drum 12 degrees apart, tool T14 (which will be initially in pocket Pn) will be 156 degrees counterclockwise (as viewed in FIG. 1) from the transfer station TS when pocket Pa (with tool T1) is in the transfer station. At the same time finger F14 will be 156 degrees counterclockwise, as viewed in FIG. 1 (or clockwise as viewed in FIG. 4), from reference plane R. Furthermore, as long as any tool, such as T14, is not removed from the pocket, and as long as the finger therefor, such as F14, is not restrained, the relation of the finger, such as F14, with respect to line R14, although changing, will remain the same as the relation of the tool, such as T14, to transfer station TS.

At the completion of the set up of the machine, all the pockets are filled with tools and all the fingers therefor are released. Thereafter, the sequence of operations may be summarized as follows (assuming drum 37 initially locked, arm 50 initially in the horizontal position, tool clamps 65 initially radially retracted, shaft 51 initially axially retracted, and initially no tool in the spindle 33):

(1) Slides 17, 21, 29 moved to machine position in response to instructions on data input device such as a tape (except on the first tool transfer cycle when no machining), (2) Drum 37 unlocked and tape stepped, calling for tool, (3) Drum indexed to bring required tool to transfer station, simultaneously bringing the control element, or finger, F for that tool to the reference position defined by radial plane R, (4) Drum locked and control element F for the particular tool in the transfer station locked by stop S for that control element, (5) After completion of the machining operation, slides 17, 21, 29 positioned for a change of tools, (6) Tool clamps 65 radially extended to grip tool in transfer station TS and (after first change cycle) to grip tool in spindle 33, (7) Tool transfer arm 50 advanced along axis C of rotation to pull tool out of drum pocket at transfer station TS and (after first change cycle) out of spindle 33, (8) Tool clamps 65 radially retracted, (9) Tool transfer arm 50 rotated 180 degrees,

(10) Tool clamps 65 radially extended,

(11) Tool transfer arm 50 retracted along axis C of rotation to push tools into spindle 33 and (after first change cycle) into the empty drum pocket at the transfer station,

(12) Cycle repeated, holding control element F for tool transferred from the drum to the spindle in plane R until that particular tool is returned to the drum and (after first tool change cycle), releasing control element F for the tool transferred from the spindle to the drum.

A circuit to effect these operations is shown in FIGS. 11, 12a, 12b, 12c, 13, and 14. In the circuit, all switch contacts operated by relays bear the number of the relay by which they are operated (with a suffix to distinguish between contacts of a relay). Normally open relay operated contacts are indicated by spaced parallel lines; normally closed relay operated contacts are indicated by spaced parallel lines with a diagonal line therethrough. All contacts of a particular limit switch bear the number of the limit switch with an additional numerical suffix to distinguish between contacts of the same limit switch. Normally open limit switch contacts are shown with the switch arm below the right hand contact; normally closed limit switch contacts are shown with the switch arm above the right hand contacts. In the description which follows, the relays with no numerical designation before the letter C are general control relays bearing no particular relation to any particular tool; the relays with a numerical designation before the letter C relate to the tool bearing the same numerical suffix.

Two lines LL1 and LL2 are connected across a source G of alternating current, as shown in FIG. 11, when switch SW1 is closed. The circuit for controlling the slide motors 18, 22, and 31 (not shown in detail but indicated generally at 170 in FIG. 12a) is connected across lines LL1 and LL2 with normally open parallel contacts C12-1 and C13-1. Closing contact C12-1 will effect movement of the slides 17, 21, 29 to positions for changing tools (specifically table 21 must be retracted to get the work out of the way) and closing switch C13-1 will effect movement of the slides to positions for machining in response to instructions on a portion (not shown) of a tape 171 (see FIG. 11). When the slides are in positions for a tool change, relay C10 is energized; when the slides are in positions for machining, relay C11 is energized.

To initiate successive machining operations on a workpiece, push button switch PB1 (FIG. 12a) is momentarily closed to energize relay C13 through normally closed contacts C11-1. The relay C13 is sealed in across lines LL1 and LL2 (until contacts C11-1 open) through normally open contacts C13-2. On subsequent tool change cycles, relay C13 is initially energized through normally open contacts C10-1, C15-1, and 2LS-1, and normally closed contacts C14-1, C17-1, C21-1, and C11-1, all of which are closed after the tool transfer arm 50 completes a tool change. An alternate current path for energizing relay C13 is effected through normally closed contacts C25-3, C11-1 and through normally open contacts C3-3 as will be described more fully hereafter. With relay C13 energized, normally open switch contacts C13-1 close and the slides move to a position for machining.

When the slides are positioned for machining, relay C11 is energized. Thus, at this time, normally closed contacts C11-1 open, dropping relay C13. Normally open contacts C11-2 close (FIG. 12b), energizing relay C20 through normally closed contacts C19–1. When relay C20 is energized, normally open contacts C20–1 close, energizing relay C21. It should be noted that normally open contacts C11–3 (FIG. 12a) are instant open, delay close, contacts and, consequently, do not close immediately when relay C11 is energized but, instead, close only after the normally closed contacts C21–2 open. Thus relay C12 is not energized at this time. When relay C21 is energized, normally open contacts C21–3 close, energizing the machining circuit which is indicated generally at 172 but which is not shown in detail. When the machining circuit is energized to machine a workpiece in response to instructions on a portion (not shown) of tape 171, relay C19 is energized and remains energized until the machining operation is completed. Energization of relay C19 causes normally closed contacts C19–1 to open, dropping relay C20. By this time, normally open contacts C19–2 have closed, sealing in relay C21 until the end of the machining operation. When the machining operation is completed, relay C19 is deenergized, dropping out relay C21. The closing of contacts C19–1 (which are instant open, delay close contacts) after relay C19 is deenergized is delayed until after the slides begin to move out of the machining position so that contacts C11–2 have already opened, preventing relay C20 from picking up at the end of the machining cycle.

The tape 171 runs between five feelers 171a on one side of the tape and five feelers 171b on the opposite side thereof. Contact of feelers through holes 171c in the tape completes circuits in accordance with the pattern of holes 171c in the tape to operate the tree switching circuit indicated generally at 174. These circuits are broken as the tape steps from one array, or pattern, of holes therein at the feelers to the next array of holes. Five circuits are operated respectively by the tape for tool selection, each circuit having a coil 171d to operate one of the five vertical groups of switches G1, G2, G3, G4, G5. In the circuitry shown in FIG. 11, 31 different relays can be selectively energized in accordance with the instruction (that is, the pattern of prepunched holes) on the tape. For example, the unique combination of the holes shown in the tape in FIG. 11 (that is, holes in the second, third, and fifth rows on the tape and none on the first and fourth rows) will effect energization of three coils 171d to raise all switch arms in groups G2, G3, and G5. With the switch arms in groups G2, G3, and G5 up, and the switch arms in groups G1, and G4 down, relay 19C1, and only relay 19C1, will be connected across lines LL1 and LL2 and energized. There is a relay for each tool and, since only 30 tools are shown in the machine described herein, only 30 tools relays are provided: Relay 1C1 for tool T1, relay 2C1 for tool T2, relay 3C1 for tool T3, and each succeeding relay for the succeeding tools. Relay 31C1 does not indicate any particular tool. Thus, the switches shown in FIG. 11 constitute a tape reader which, with tape 171, defines a data input device. Each unique array of holes in tape 171 constitutes an instruction which energizes a particular relay to define a signal for the selection of, or designation of (that is, a signal calling for) a particular tool. More specifically, the signal renders a particular position sensor, alone, effective to control the tool storage drum and bring the tool therein corresponding to the effective position sensor to the transfer station for subsequent transfer to the operating station.

At the beginning of a machining cycle, the tape 171 is in an operating position (with a hole or holes in registration with the feelers), the tape energizing a relay corresponding to the tool currently in the tool spindle (or energizing relay 31C1 on the first tool change cycle when there is no tool in the spindle). At this time relay C1 (FIG. 12a), which is connected in series with the parallel array of 31 normally open contacts 1C1–1, 2C1–1, 3C1–1 and up to 31C1–1, is energized. At the same time, since relay C21 (FIG. 12b) is energized and relay C3 (FIG. 12a) is deenergized, relay C2 is momentarily energized through normally open contacts C21–4 and normally closed contacts C3–1. This closes normally open contacts C2–1, energizing relay C4 (FIG. 12a). When relay C4 is energized, normally open contacts C4–1 (FIG. 11) close to connect tape motor 171m across lines LL1 and LL2. This initiates movement of the tape 171 and deenergizes all the coils 171d to open all the switches of groups G1, G2, G3, G4, G5. Thus none of the 31 relays 1C1 to 31C1 are energized and therefore relay C1 becomes deenergized at this time. Relay C3 (FIG. 12a) is energized at this time through normally open contacts C2–2, through normally open, instant open, delay close, contacts C21–5, and through normally closed contacts C1–1. Relay C3 is sealed in through normally open contacts C3–2 until contacts C21–5 open after the end of the machining operation. Energization of relay C3 opens contacts C3–1 to deenergize relay C2. The relay C4, initially energized through energization of relay C2, is sealed in through normally open contacts C4–2 and normally closed contacts C1–2 after the tape begins to move and relay C1 is deenergized. Relay C4 is deenergized when the tape moves to the next tool instruction and one of the 31 relays, 1C1 to 31C1 is energized to again energize relay C1, which causes normally closed contacts C1–2 to open. With a new instruction on the tape, a new tool relay, such as relay 1C1 (FIG. 11), will be energized to call for tool T1.

There is a position sensor PI (comprising contacts 115, 116, 117, 118, a finger F with brush 113 defining a switch arm for the contacts, and a stop S to restrain the finger in a predetermined position R) for each tool and some, but not all, of the position sensors are shown schematically (all as viewed as in FIG. 1) in FIG. 13. The inner contact ring 115 of each position sensor is electrically connected to line LL1 through normally open contacts (1C1–2, 2C1–2, 3C1–2, and up to 30C1–2, respectively) of the tool relay for the tool to which the position sensor corresponds. The outer contacts 116, 117, and 118 of all the position sensors are connected to line LL2 in series, respectively, with relay C7, C6, and C5. Since only one of the relays 1C1, 2C1, 3C1, up to 30C1 are energized at any one time, only one position sensor PI is rendered effective (that is, is connected across lines LL1, LL2) at any one time. The fingers F define, for each tool, followers which have the spring urged brush 113 mounted therein. The brush 113 is positioned in the finger to bridge the inner and outer contacts, and the fingers F thereby define switch arms, or movable control elements, which cooperate with the stationary control elements defined by the fixed contacts 115, 116, 117, 118. All of the followers F rotate (with shaft 35a), including the follower of the position sensor rendered effective by connection across lines LL1, LL2, unless the follower is disabled (that is, restrained by a stop S. When, for example, the relay 1C1 is energized in response to the instruction on the tape calling for tool T1, the contacts 1C1–2 are closed, connecting the inner contact ring 115 of position sensor PI1 only to the line LL1. The inner contact rings 115 of the other position sensors remain disconnected from line LL1 at this time. The brush 113 of position sensor PI1 will be spaced from line R1 a distance (and in the direction) corresponding to the position of the tool T1 with respect to the transfer station TS.

If the tool T1 is in the transfer station, the brush 113 will be on line R1 and relay C5 (FIG. 13) will be energized. Contacts C5–1 (FIG. 12a) will be closed and solenoid SOL3 will be energized, holding plunger 90 forward (FIG. 6) and the drum locked. Switch SW3, which is open during operation of the machine, is provided for selective energization of solenoid SOL3 (to lock the drum) by the machine operator during set up of the machine. FIG. 14 shows circuitry for tool T1 which is provided (but not shown) for every tool. When, after relay 1C1 is energized and relay C5 becomes energized, relay 1C2 (FIG. 14) will be energized through normally open contacts 1C1–3, C5–2, and normally closed contacts 1LS–1, 1C3–1, the relay 1C2 being sealed in (until contacts 1C3–1 open) through normally open contacts 1C2–1. With relay 1C2 energized, solenoid SOL S1 of the solenoid actuated stop S1 is energized through normally open contacts 1C2–2, and the finger F1 is restrained at reference position R1 by stop S1. A switch SW2, which is open during operation of the machine, is provided for selective energization of solenoid SOL S1 by the machine operator during set up of the machine.

If the brush 113 of position indicator P11 were in the position shown in solid lines in FIG. 13 relative to the line R1, the tool T1 would be in a corresponding position with respect to transfer station TS. The shortest path for the tool will be followed if the tool is moved clockwise, as viewed in FIG. 1, to the transfer station. With the brush 113 as shown in solid lines, the relay C7 will be energized when switch contacts 1C1–2 close. At this time, solenoid SOL3 will be deenergized and the drum unlocked. Thus, limit switch 1LS will be operated and the normally open contacts 1LS–2 (FIG. 12a) will be closed. When normally open contacts C7–1 close on energization of relay C7, relay C8 will be picked up, closing normally open contacts C8–1 and energizing solenoid SOL1. Relay C8 is sealed in through normally open contacts C8–2 until contacts 1LS–2 open. The energization of solenoid SOL1 operates valve 129 to cause the motor 85 to rotate the drum clockwise (as viewed in FIG. 1). Thus, shaft 35 and shaft portion 35a rotate clockwise (as viewed in FIG. 1), moving control element, or finger, F1 clockwise (as viewed in FIGS. 1 and 13) toward the reference line R1 as the tool T1 moves clockwise (as viewed in FIG. 1) toward the transfer station TS.

If the brush 113 of finger F1 were initially in the position shown in dotted lines in FIG. 13, the relay C6 would be energized when switch contacts 1C1–2 closed. Thus, instead of relay C8 being picked up, relay C9 will be energized through normally open contacts C6–1 and 1LS–3. Relay C9 will be sealed in through normally open contacts C9–1 until contacts 1LS–3 open. When relay C9 is picked up, solenoid SOL2 is energized through normally open contacts C9–2, and valve 129 is operated to run drum motor 85 in a direction to rotate the drum counterclockwise as viewed in FIG. 1. This moves tool T1 counterclockwise, as viewed in FIG. 1 (the shortest path) toward transfer station TS and moves control element F1 counterclockwise (as viewed in FIGS. 1 and 13) toward reference line R1. Push button switch PB2 is provided for selective energization of solenoid SOL1 (and selective clockwise rotation of the drum) by the machine operator during set up of the machine; push button switch PB3 is provided for selective energization of solenoid SOL2 (and selective counterclockwise rotation of the drum) by the machine operator during set up of the machine.

Whether the tool T1 and control element F1 move clockwise or counterclockwise, they continue moving until the brush 113 of the effective position sensor PI1 engages contact element 118. As previously described, this energizes relay C5 to lock the drum and release limit switch 1LS. It should be noted that when shaft 35a rotates in one direction or the other to swing the brush 113 to the reference line R as the selected tool is moved, in one direction or the other, to the transfer station, the brush 113 is continuously engaged with inner conductor 115. As the tools in the drum swing through the transfer station, the holes 92 in the drum swing past the plunger 90, each hole instantaneously in registration with plunger 90 when a tool is instantaneously in the transfer station. As the selected tool in the drum approaches the transfer station, and after the preceding tool in the drum has passed through the transfer station, the brush 113 of the selected position indicator initially engages contact 118 which shifts plunger 90 to the left (as viewed in FIG. 6). However, at this time, the hole 92 which must receive plunger 90 to stop the drum with the selected tool in the transfer station, has not yet reached a position of registration with plunger 90, although the preceding hole 92 has passed a position of registration with plunger 90. Thus, plunger 90 is urged against the drum 37 but does not slide into a hole 92 to stop the drum and release limit switch 1LS until the next hole 92 swings into registration with the plunger. Relay C6 or C7, whichever was energized, is deenergized as the brush 113 leaves the contact 116 or 117 and arrives at the reference position R1. The release of limit switch 1LS opens contacts 1LS–2 and 1LS–3, thereby deenergizing whichever relay C8 or C9 was energized. This deenergizes solenoid SOL1 or solenoid SOL2, whichever was energized, to return the valve member 130 (FIG. 10) to a center position, stopping motor 85. At the same time, contacts 1LS–1 (FIG. 14) close, energizing relay 1C2 to lock the control element finger F1 which is now at reference line R1.

It should be noted that although, in the embodiment of the invention disclosed, all reference lines R1, R2, to R30 have been described as lying in a common plane R, the reference line (and contact 118) of any position sensor can lie at any angular position. It is only necessary that, in the position sensor for a particular tool, the control element finger, which defines a follower to follow that tool as it moves with the drum, be initially angularly set from the reference line of the position sensor (and contact 118) a distance and in a direction corresponding to the distance and direction of the particular tool from the transfer station. Then, when the drum rotates, the follower finger will approach the reference line (regardless of its angular position) as the tool approaches the transfer station and the finger will reach the reference line simultaneously as the tool reaches the transfer station. It should also be noted that the speed and/or direction of movement of the finger of a position sensor for any given tool need not be identical to the speed and/or direction of movement of that tool in the storage magazine. It is only necessary that the movement of the movable control element with respect to the stationary control elements (contacts 115, 116, 117, 118) be proportional in speed to the movement of the selected tool in the magazine with respect to a transfer station and related in direction (that is, the control element always move in the same direction as the tool in the drum or always move in the opposite direction as the tool in the drum). If these requirements are met, the movable control element will approach a predetermined reference position (where a signal to stop the drum is produced) as the selected tool approaches the transfer station. In other words, the movement of each movable control element must correspond to, or be synchronized with, the movement of a particular tool but need not be identical thereto.

At the end of the machining cycle (or, on the first tool transfer cycle, when the drum is locked with the selected tool in the transfer station), relay C12 (FIG. 12a) is energized through normally open contacts C11–3, C25–2 (which will be closed if a tool exchange is required), and normally closed contacts C21–2, 1LS–4, and C10–2. Relay C12 is sealed in through normally open contacts C12–2 until the normally closed contacts C10–2 open on energization of relay C10. Energization of relay C12 closes contacts C12–1 to effect movement of the slides to positions for a change of tools. When the slides are properly positioned, relay C10 (FIG. 12a) is energized and relay C12 is dropped out. After the slides are in position for a tool change, the transfer arm 50 is moved through a tool change cycle (unless the tool just called for on the tape is the same as the tool previously called for and is already in the spindle 33. At the time the slides approach their change position, solenoid SOL4 is deenergized and shaft 51 is retracted; solenoid SOL6 is deenergized and the tool clamps 65 are radially retracted; and, since arm 50 rotates only 180 degrees on each tool transfer cycle, piston 59 and rack 61 will either be in the left hand position (FIG. 7) with solenoid SOL5 energized (FIG. 10), or in the right hand position with solenoid SOL5 deenergized. If rack 61 is to the left, limit switch 4LS will be operated and limit switch 5LS unoperated; if rack 61 is to the right, limit switch 4LS will be unoperated and limit switch 5LS operated.

It should be noted that there are usually two fingers in the reference plane R: the finger of the tool in the spindle and the finger of the tool in the transfer station (the tool in the transfer station being either about to be transferred to the spindle or just transferred from the spindle). At the time the tape calls for a tool, the tool in the transfer station will be the tool just returned from the spindle. When a new instruction is given by the tape, the new instruction will either call for the tool in the spindle, the tool in the transfer station, or one of the other tools. If the new instruction calls for the tool in the spindle, no tool transfer cycle is desired to effect a tool exchange. If any other tool is specified in the new instruction, a tool transfer cycle is required to effect the tool exchange.

A relay 1C3 is provided for tool T1, as shown in FIG. 14, and relays 2C3, 3C3, and up to 30C3 (not shown) are provided, respectively, for the other tools. The relay 1C3 is connected in series with normally closed contacts 4LS–1 of limit switch 4LS, with normally closed contacts 5LS–1 of limit switch 5LS, and with a parallel array of normally open contacts 2C1–4, 3C1–4, and up to 30C1–4. For each tool, the parallel array comprises contacts of all the other tool relays. Each time the arm 50 rotates 180 degrees, both limit switches 4LS and 5LS are released so that, on each tool transfer cycle, the relay 1C3 (for example) is picked up unless the instruction on the tape calls for tool T1. Similarly relay 2C3 or 3C3 is picked up on each cycle unless the tool T2 or T3, respectively, is called for on the tape. The significance of this is that if, for example, tool T1 is called for on a tape instruction, relay 1C3 will not be picked up until a different tool is called for by the tape (and even then only when the arm 50 is making the tool exchange). Thus, the relay 1C3 is energized (thereby opening normally closed contacts 1C3–1 to drop relay 1C2 and solenoid SOL S1, releasing the stop S1 on finger F1) as the tool T1 is being returned from the tool spindle to the tool transfer station TS. Consequently, when the drum again rotates with tool T1 therein, finger F1 will also rotate, following the tool T1.

As shown in FIG. 14, each tool has a relay (as the relay 1C4 for tool T1) which is energized, by closure of normally open contacts 1C1–5, when the particular tool is called for. The relay is sealed in through its own normally open contacts 1C4–2 and a series connection of normally closed contacts 2C1–5, 3C1–5, 4C1–5, up to 30C1–5 so that, when any other tool relay is energized, the relay 1C4 will be dropped. If the tape calls for tool T1 twice in succession, relay 1C5 will be energized through normally open contacts 1C1–6 and 1C4–1. As shown in FIG. 12c, a relay C25 is connected across lines LL1 and LL2 in series with normally open contacts C1–3 and normally closed contacts 1C5–1, 2C5–1, 3C5–1, up to 30C5–1. Consequently, if any tool is called for twice in succession, no tool change is required and relay C25 is not energized. If the tool called for by a tape instruction is different than the tool previously called for, a tool change is required and relay C25 will be energized. Relay C25, if energized, is dropped every time the tape steps to a new instruction. It will be noted that relay C12 (which initiates movement of the slides to positions for a tool change) can be picked up only if normally open contacts C25–2 close (on energization of relay C25 to indicate a tool exchange required). If no tool change is required, normally closed contacts C25–3 and normally open contacts C3–3 are closed at the end of a machining operation, as are contacts C11–1, so that relay C13 is energized at that time, initiating movement of the slides to a new machining position in accordance with machining instructions on a portion (not shown) of the tape.

Assuming that a tool exchange is required and the slides are moved to a change position, relay C10 (FIG. 12a) is energized to close contacts C10–3 when the slides reach the change position. Thus, at this time, relay C14 is energized through normally open contacts C10–3 and normally closed contacts 3LS–1 and C15–2. This closes normally open contacts C14–2 and energizes solenoid SOL6 which causes movement of tool clamps 65 outwardly. When the arms are extended, limit switch 2LS is released, closing normally closed contacts 2LS–2. Thus relay C17 is energized through normally closed contacts 2LS–2, C15–3, and C18–1. Relay C17 is sealed in around contacts 2LS–2 and C15–3 by normally open contacts C17–2. When relay C17 is energized, normally open contacts C17–3 are closed to energize solenoid SOL4. This produces an axial advance of shaft 51.

Before shaft 51 advances, limit switch 6LS (FIG. 7) is operated and, since one or the other of limit switches 4LS, 5LS is operated, relay C24 (FIG. 12b) will be energized through normally open contacts 6LS–1 and either normally open contacts 4LS–2 or 5LS–2. Relay C24 is sealed in around the contacts 6LS–1 by normally open contacts C24–1. After shaft 51 advances, limit switch 3LS is operated and, at that time, either relay C22 or C23 is energized, depending on whether limit switch 4LS or 5LS is operated. If rack 61 is to the left and limit switch 4LS operated, relay C22 is energized, when limit switch 3LS is operated, through normally open contacts 4LS–3, 3LS–2, and C24–2. Relay C22 is sealed in through normally open contacts C22–1 and normally closed contacts C23–1. If rack 61 is to the right and limit switch 5LS is operated, relay C23 is energized, when limit switch 3LS is operated, through normally open contacts 5LS–3, 3LS–3 and C24–3. Relay C23 is sealed in through normally closed contacts C22–2 and normally open contacts C23–2. If relay C22 is energized on one tool transfer cycle, relay C23 will be energized on the next cycle, dropping out relay C22 when switch contacts C23–1 open. If relay C23 is energized during a tool transfer cycle, relay C22 will be energized on the next cycle, dropping out relay C23 when switch contacts C22–2 open. Thus, on every other tool transfer cycle, relay C23 is energized, energizing solenoid SOL5 through normally open contacts C23–3 and shifting rack 61 to the left. On alternate tool transfer cycles, relay C22 is energized and solenoid SOL5 is deenergized so that rack 61 is shifted to the right.

When rack 61 begins to move, and arm 50 begins its rotation, both limit switches 4LS and 5LS are simultaneously released, and relay C15 is energized through normally closed contacts 4LS–4 and 5LS–4. Relay C15 is sealed in through normally open contacts C15–4 and normally closed contacts C2–3. When relay C15 is energized at the beginning of the rotation of the arms, normally closed contacts C15–2 open to drop out relay C14. This deenergizes solenoid SOL6 to retract tool clamps 65. At the same time, normally open contacts C15–5 close and, since normally closed contacts 6LS–2 are closed at this time, relay C16 is energized when the movement of rack 61 (and the 180 degree rotation of arm 50) is completed and either limit switch 4LS is operated (to close normally open contacts 4LS–5) or limit switch 5LS is operated (to close normally open contacts 5LS–5). When relay C16 is energized, contacts C16–1 close to again energize relay C14 and produce outward radial movement of the tool clamps 65. When the tool clamps are again extended, limit switch 2LS is again released, and relay C18 is energized through normally closed contacts 2LS–3 and normally open contacts C15–6. When relay C18 is energized, normally closed contacts C18–1 open to release relay C17. This opens contacts C17–3 to release solenoid SOL4 and effect retraction of shaft 51. When shaft 51 reaches its retracted position, limit switch 6LS is operated, opening normally closed contacts 6LS-2 and dropping relay C16. This opens contacts C16-1 and drops relay C14 which deenergizes solenoid SOL6 to again retract the tool clamps 65.

In the embodiment of the invention described above, a finger F and brush 113 define a movable control element, or follower, of a position sensor PI for each tool T. As previously described, all the followers move (unless disabled) when the storage magazine 37 moves the tools. However, only one position sensor (the position sensor of the tool called for) is rendered effective, at any one time, to control movement of the drum. Under the control of this position sensor, the drum brings the called for tool to the transfer station for removal to the operating station. The follower of this position sensor is disabled (that is, held stationary) when the tool is removed from the magazine. The tool is returned to the magazine at the same point, transfer station TS, at which the tool was taken from the magazine and, as soon as the tool is returned to the magazine, the follower, or finger control element, is again activated to move with the tool when the tool is moved by the storage magazine. Since the follower for each tool moves an amount and in a direction corresponding to the movement of the tool in the drum, and is arrested while the tool is out of the drum, the follower follows the tool. Thus the follower continuously knows the position of the tool and instructions transmitted to the follower of a tool are effective in controlling movement of that tool.

In another embodiment of the present invention, the position sensor for each tool is a counter and the follower of each counter is an electrical flow which steps to successive current paths of the counter when the tool is moved by the drum. Although all followers of tools in the drum move with the respective tools, only the counter of the tool called for is effective in controlling the drum to bring that tool to the transfer station. The follower of that counter is stationary, or disabled (that is, the current remains in one current path) when the tool is removed from the drum. Thus, as in the previous embodiment, a follower follows the tool when the tool is in the drum so that instructions transmitted to the counter of the desired tool are effective in moving that particular tool to the transfer station for transfer to the spindle.

In this embodiment a conventional counter, such as the counter ring shown and described at page 147 of Understanding Digital Computers by Siegel (John Wiley & Sons, 1961), is provided as a position sensor for each tool in place of the position sensor comprising the control finger F, brush 113, conductor rings 115, 116, 117, 118, and stop S of the previous embodiment. As shown in FIG. 15, the counter ring CR for each tool (each counter ring having a numerical suffix corresponding to the numerical suffix of the tool) has a thyratron tube for each tool pocket (assuming eight pockets only for illustrative purposes) 1TH, 2TH, 3TH, 4TH, 5TH, 6TH, 7TH, 8TH. The plates of all tubes are connected to a line LL10 which is connected through resistor 1RES to a source of positive voltage. The grid of each tube is connected through a capacitor 1CAP to an input line LL11. Between the cathode of each tube and a source of negative voltage, there are connected a pair of series connected resistors 2RES and 3RES. Between the resistors 2RES and 3RES of each tube there is a reference point REF (with a numerical prefix the same as the tube) connected directly to the grid of the next tube. Although the tubes need not be physically arrayed in a circle, they are connected in a ring with 1REF of tube 1TH connected to the grid of tube 2TH, the reference points REF of each tube connected to the grid of the succeeding tube, and the reference point 8REF of tube 8TH connected to the grid of tube 1TH. Between ground and each tube cathode there is connected a resistor 4RES, and a capacitor 2CAP and relay CT are connected in parallel across each resistor 4RES (each of the relays CT having numerical prefixes the same as the thyratron tube and having numerical suffixes the same as the suffix of the counting ring).

In this embodiment of the invention, the drum, which has eight tool pockets, has dogs D connected thereto in radial alignment, respectively, with the tool pockets (see FIGS. 16 and 17). The drum, designated as 237 in this embodiment, is similar to the drum 37 of FIG. 6 (except for tool capacity) and has eight equally angularly spaced holes 292 to receive the plunger 90. A limit switch 10LS is mounted on plunger housing 87 and is operated by each dog D (shortly before the plunger 90 is aligned with a hole 292) as the drum rotates. The limit switch 10LS is held in operated condition by a dog if the drum is locked, and is released after the holes 292 pass the plunger 90 when the drum is rotating.

Each thyratron tube corresponds to an angular position about axis B. One tube, say 1TH, corresponds to the transfer station TS; the next tube 2TH corresponds to an angular position 45 degrees clockwise from the transfer station; and each succeeding tube corresponds to an angular position 45 degrees from the preceding tube. Thus tube 8TH corresponds to an angular position 45 degrees counterclockwise from the transfer station. The ring counters for the tools, which define the tool position sensors of the present embodiment of the invention, are each connected in a circuit as shown in FIGS. 15 and 18 (which, in this embodiment, replaces the circuitry of FIG. 13). A source of positive D.C. voltage SP is connected through switch SW10, normally open contacts 10LS-1 of limit switch 10LS and normally closed contacts 1C2-3 of relay 1C2 (FIG. 14) to the input line LL11. A return path to ground is provided through resistor 5RES which has one end connected between contacts 10LS-1 and 1C2-3 and the other end connected to ground.

Initially, the tools, T1, T2, T3, T4, T5, T6, T7, T8 may be placed in the drum 237 in random fashion. Each tool has a position sensor in the form of the ring counter, and the tube of the counter corresponding to the pocket in which the tool is placed is caused to conduct during set up. One tube 1TH corresponds in angular position to the transfer station. If tool T1 is placed in the first pocket counterclockwise from the transfer station, the tube TH8, which is one tube counterclockwise from the tube TH1, of the counting ring CR1 corresponding to tool T1 is energized during set up by the operator. To energize tube TH8, the switch SW11 connected to the grid of that tube is closed, connecting that grid to line LL12 which is connected to a low, positive voltage source through resistor 6RES. This connection primes the tube TH8. In a similar manner one thyratron tube of each counting ring (corresponding to the pocket in which the tool identified with that counting ring is placed) is primed by the operator during set up. All of the plates of the thyratron tubes are connected to line LL10 which is connected to a source of positive voltage through resistor 1RES but, initially, none of the tubes conduct, even the tube which is primed. At this time switch contacts 10LS-1 and 1C2-3 are closed and, when switch contacts SW10 are closed, a positive pulse is transmitted to line LL11 and the grids of all the tubes. This pulse is large enough to start the primed tube conducting, but starts none of the unprimed tubes. Thus, in each position indicator, one tube, and only one tube, is conducting during set up, and that tube is the tube corresponding to the pocket in which the tool the position sensor is to follow is located.

Assume the position sensor shown in FIG. 15 is the position sensor CR1 for tool T1 and that tool T1 is in the first pocket counterclockwise from the transfer station. Thus, when machining operations begin, tube 8TH is conducting. Whenever any tube is conducting, current flows in the cathode circuit with two results: the relay CT thereof is energized and the reference point REF thereof is driven sufficiently positive to prime the grid of the next tube which is connected thereto. Thus, at this time, in the position sensor for tool T1, tube 8TH is conducting, relay 1CT8 is energized, and tube 1TH is primed. If tool T1 is called for by the tape, only counter CR1 will be effective in controlling the drum. Relay 1C1 (FIG. 11) will be energized as previously described, and, as shown in FIG. 18, relay C7 will be energized through normally open contact 1C1–5, normally closed contact 1CT1–1, and normally open contact 1LS–5. The drum is unlocked at this time, and, as previously described, energization of relay C7 causes the drum motor to rotate the drum clockwise. It will be noted that if tool T2 had been called for, relay C7 would have been energized in the same manner through corresponding contacts (normally open contacts 2C1–5 and normally closed contacts 2CT1–1) and would have been under the control of the position sensor CR2 for tool T2. In either case, relay C7 is sealed in through normally open contacts C7–2. It will be understood that circuitry in FIG. 18 is only for tools T1 and T2, and that similar circuitry, not shown, is provided for the other tools.

The rotation of the drum causes periodic closing of normally open limit switch contacts 10LS–1. Each closure of this contact imparts a pulse to line LL11 of each position sensor (if not disabled) which causes the primed tube (the tube ahead of the conducting tube) to start conducting. When this next tube begins to conduct, the plate voltage of the tube which was conducting is momentarily lowered since there are two current paths from line LL11 to the negative voltage source. At the same time, the grid of the previously conducting tube is negative, and the drop in plate voltage is sufficient to stop this tube from conducting.

Thus, as the drum moves through each increment of 45 degrees, the switch contacts 10LS–1 close once, moving the charge in each counter, or position sensor, from one tube to the next (unless the counter is disabled as subsequently described). It will be noted that each counter, or position sensor, has eight current paths (each including a thyratron tube), only one of which is energized at a time. The current steps from path to path in each counter, and the electronic charge steps from tube to tube therein. Although all the counters are stepping (unless disabled) it is only the counter, or position sensor, for tool T1 which exerts control over the mechanism since it is only tool relay 1C1 which is energized at this time. As the tool pocket carrying tool T1 approaches the transfer station TS, the limit switch contacts 10LS–1 close, causing tube TH1 to conduct and energizing relay 1CT1. This energizes relay C5 through normally open contacts 1C1–6 and 1CT1–2 which, as previously described, advances the lock plunger. If tool T2 had been the tool called for, relay C5 would have been energized through corresponding contacts (normally open contacts 2C1–6 and normally open contacts 2CT2–2) associated with tool T2. When the plunger enters hole 292, limit switch 1LS is released, dropping relay C7 to stop the drum motor. As soon as the tool T1 arrives at the transfer station TS and relay C5 is energized, relay 1C2 (FIG. 14) is energized through contacts C5–2. This opens contact 1C2–3 (FIG. 15) to disconnect the position sensor for tool T1 from the source SP, thereby disabling the follower and preventing stepping of the charge in response to operation of limit switch 10LS. In the same manner, if tool T2 or tool T3 had been called for, the counters CR2 or CR3 would be disabled when the tools T2 or T3 reached the transfer station (by opening contacts 2C2–3 or 3C2–3) as counter CR1 was disabled by opening contacts 1C2–3.

After the tool T1 reaches the transfer station, it is removed from the drum and transferred to the spindle by the transfer arm as previously described. At the same time, the tool from the spindle is transferred to the tool drum. When the tool returned from the spindle (say tool T5) is placed in the pocket at the transfer station from which tool T1 was taken, the position sensor for tool T5 (not shown), which was disabled when tool T5 was removed from the drum (by opening contacts corresponding to the contacts 1C2–3 of FIG. 15), is again activated by closing these contacts. Thus, when the drum resumes rotation, in response to a call for a new tool, the charge in the position sensor for tool T5 will step, following the tool T5 as the tool is moved by the drum. The charge in the position sensor for tool T1, however, will remain in tube 1TH (corresponding to the transfer station angular position) until the tool is returned to the drum at the transfer station.

To simplify the explanation, a unidirectional counter has been illustrated and only clockwise movement of the drum contemplated in the embodiment utilizing these counters. It will be understood that a reversible counter could also be used as a position sensor for each tool, to achieve movement of the drum in either direction as in the embodiment utilizing the mechanical followers.

In the embodiments of the present invention previously described, there was a tool relay (such as 1C1) for each tool stored in the drum, and each relay was energized in response to a particular coded instruction on the tape. Thus, if a different set of thirty tools were to be used, the same codes on the tape would have to be used for the different tools. In other words, when the tape was prepared for the first set of tools, a particular arrangement of holes on the tape would indicate one particular tool and, when the tape was prepared for the second set of tools, the same arrangement of holes would indicate a different tool.

In the embodiment shown in FIG. 19, a very much larger number of different tools can each have a unique coded instruction in the form of a unique set of holes on the tape since a more extensive relay tree is provided in the tape reader. Each branch of the relay tree terminates in a female socket 200. If there are 10 groups of switches, there will be over 1000 sockets, and over 1000 different tool code numbers can be handled. As before, a set of, say, thirty tools are selected for the job, each tool having a particular array of code holes permanently assigned thereto. When the tape is prepared for a particular job, new codes need not be assigned to the selected tools. Instead, the permanent codes are used. This means that only thirty of the over one thousand terminals 200 will be used. Thirty plugs 201, each connected to one of the tool relays, are provided. The plug connected to the relay for a particular tool is inserted in the terminal which will be energized when the coded instruction on the tape calls for that particular tool. In this manner, a large group of tools can be assigned code numbers (that is, assigned a unique array of holes on the tape) and selected tools from this group can be used in machining, using the permanently assigned code numbers.

To summarize briefly the mechanism disclosed herein:

(1) Each tool has a position sensor with a movable follower initially set relative to a reference position in accordance with the position of the tool in the drum relative to the transfer station.

(2) As the drum rotates, the tool pockets pass through the transfer station one at a time.

(3) As the drum rotates, the position sensor followers of tools in the drum rotate with the drum and are synchronized therewith, rotating in a direction and amount corresponding to the extent and direction of rotation of the drum.

(4) When a particular tool is called for, the position sensor for that particular tool only controls rotation of the drum, bringing the selected tool to the transfer station.

(5) A tool is removed from the drum at the transfer station and is returned to the drum at the same place.

(6) The position sensor follower for a tool removed from the drum is deactivated while the tool is out of the drum but activated when the tool is returned to the drum.

Accordingly, each follower keeps track of a particular tool, following the tool while the tool is in the drum, and waiting for the tool when the tool is temporarily out of the drum. Thus, the follower of a position sensor is always aware of the position of the tool it follows, and an input signal transmitted to the position sensor of a tool can therefore control movement of the tool. Since the followers of the position sensors always know the location of the respective tools, the storage mechanism can be characterized as having a memory capable of keeping track of all the tools regardless of the change of particular tools from pocket to pocket by the mechanism as the tools are transferred to and from the spindle.

What is claimed is:

1. Mechanism for handling a group of different tools in a machine tool having an operating station comprising:
   (a) means defining a storage area for the tools,
   (b) means to produce a predetermined sequence of input signals, each signal specifying a particular tool,
   (c) a position sensor for each tool, each position sensor having a movable follower operable to follow the tool in the machine tool,
   (d) means to transmit each input signal to the position sensor for the tool specified by the signal,
   (e) means to move the tools one at a time from a stored position in the storage area to a predetermined transfer station in response to the respective positions of the followers of the position sensors for the specified tools,
   (f) means to exchange the tool in the transfer station with a tool in the operating station,
   (g) and means to deactivate the position sensor for the tool moved from the transfer station to the operating station and to reactivate the position sensor for the tool moved from the operating station to the transfer station.

2. In a machine tool for performing a variety of operations with a plurality of different tools:
   (a) means to produce a sequence of input signals, each signal specifying a particular tool,
   (b) a magazine to store the tools, said magazine movable to bring selected tools to a transfer station for removal from the magazine,
   (c) a position sensor for each tool, each position sensor hvaing a follower activated when the tool is in the magazine for movement with the magazine and deactivated when the tool is removed from the magazine, and
   (d) means to transmit each input signal to the position sensor for the tool specified by the signal to control movement of the magazine.

3. In a machine tool for performing a variety of operations one at a time at an operating station with a sequence of different tools,
   (a) means to produce a sequence of input signals, each signal specifying a particular tool,
   (b) a magazine to store the tools, said magazine rotatable to bring selected tools to a transfer station,
   (c) a position sensor for each tool, each position sensor having a follower set to a position corresponding to the position of the tool in the magazine, each follower activated for operation with the magazine when the tool is in the magazine and deactivated when the tool is removed from the magazine,
   (d) means responsive to each input signal to render the position sensor for the tool specified by the input signal effective in controlling rotation of the magazine to bring the specified tool to the transfer station, and
   (e) means to effect an exchange between the tool in the transfer station and the tool in the operating station.

4. In a machine tool for performing a variety of operations one at a time at an operating station with a succession of different tools comprising:
   (a) means to produce a sequence of input signals, each signal specifying a particular tool,
   (b) a magazine to store the tools, said magazine rotatable to bring selected tools to a transfer station,
   (c) a shaft rotatable with the magazine,
   (d) a control element for each tool mounted on the shaft and rotatable therewith unless restrained,
   (e) means responsive to the position of the control element for a particular tool specified by the input signal to effect rotation of the magazine and bring the particular tool to the transfer station, said rotation terminating when the control element for that tool is in a predetermined angular position,
   (f) means to move a tool out of and into the magazine at the transfer station,
   (g) and means to restrain the control element for a particular tool when the tool is out of the magazine.

5. In a machine tool for performing a variety of operations one at a time at an operating station with a succession of different tools comprising:
   (a) means to produce a sequence of input signals, each signal specifying a particular tool,
   (b) a magazine to store the tools, said magazine rotatable to bring selected tools to a transfer station,
   (c) a position sensor for each tool having a current flow defining a follower movable with the magazine unless deactivated,
   (d) means responsive to the position of the follower for a particular tool specified by the input signal to effect rotation of the magazine for transport of said particular tool to the transfer station, said rotation terminating when the follower for said tool is in a predetermined angular position,
   (e) means to move a tool out of and into the magazine at the transfer station,
   (f) and means to deactivate the follower of the position sensor for a tool when that tool is removed from the magazine at the transfer station and to reactivate said follower when said tool is returned to the magazine at the transfer station.

6. In a machine tool for performing a variety of operations one at a time at an operating station with a succession of different tools comprising:
   (a) means to produce a sequence of input signals, each signal specifying a particular tool,
   (b) a circular magazine to store the tools, said magazine rotatable to bring selected tools to a transfer station,
   (c) a shaft rotatable with the magazine,
   (d) a finger for each tool mounted on the shaft and rotatable therewith unless restrained, each finger defining a switch arm effective in response to an input signal for that tool to initiate rotation of the magazine,
   (e) means to stop rotation of the magazine when the finger is in a predetermined angular position with the particular tool in the transfer station,
   (f) means to restrain the finger for the tool at the transfer station from rotation,
   (g) means to exchange the tool in the transfer station with the tool in the operating station,
   (h) and means to release the finger for the tool transferred to the magazine from the operating station.

7. In a machine tool for performing a variety of operations one at a time at an operating station with a succession of different tools comprising:
   (a) a data input device to produce a sequence of input signals, each signal specifying a particular tool,
   (b) a circular magazine to store the tools, said magazine rotatable to bring selected tools to a transfer station,
   (c) a position sensor for each tool having a plurality of current paths, one of said current paths energized at a time to indicate the position of the tool relative to the transfer station,
   (d) a motor operable in response to the position sensor for the tool specified by the data input device to rotate the magazine, (e) means responsive to rotation of the magazine to shift the current from path to path in all the position sensors, (f) means responsive to current flow in a predetermined path of the position sensor for the tool specified by the data input device to stop the magazine motor with the specified tool at the transfer station, (g) transfer mechanism to move a tool at the transfer station from the magazine to the operating station and from the operating station to the magazine at the transfer station, and (h) means to prevent a shift of current from path to path in the position sensors of tools removed from the magazine while said tools are out of the magazine.

8. In a machine tool for performing a variety of operations one at a time at an operating station with a succession of different tools comprising:

(a) means to produce a sequence of input signals, each signal specifying a particular tool, (b) a circular magazine to store the tools, said magazine rotatable to bring selected tools to a transfer station, (c) a shaft rotatable with the magazine, (d) a finger to control each tool, each finger mounted on the shaft and rotatable therewith unless restrained to define a switch arm, (e) a stop for each finger, (f) stationary circular conductors mounted adjacent each switch arm and effective with the switch arm to initiate rotation of the magazine in response to a signal for the tool controlled by that switch arm, the rotation of the magazine stopping when the switch arm is in a predetermined angular position with the tool controlled thereby in the transfer station, (g) means to actuate the stop for the finger in the transfer station on termination of rotation of the magazine, (h) transfer mechanism to exchange the tool in the transfer station with the tool in the operating station, (i) and means to release the stop for the finger restrained after the next to last rotation of the magazine.

9. In a machine tool for performing a variety of operations one at a time at an operating station with a succession of different tools comprising:

(a) a data input device to produce a sequence of input signals, each signal specifying a particular tool, (b) a circular magazine to store the tools, said magazine rotatable to bring selected tools to a transfer station, (c) a counter for each tool settable in accordance with the position of the tool in the magazine relative to the transfer station, (d) a motor operable in response to the counter for the tool specified by the data input device to rotate the magazine, (e) means responsive to rotation of the magazine to step all the counters, (f) means responsive to the operation of the counter for said specified tool to stop the magazine when the specified tool is in the transfer station, (g) transfer mechanism to move a tool at the transfer station from the magazine to the operating station and from the operating station to the magazine at the transfer station, (h) and means to disable the counter for a tool removed from the magazine until the tool is returned to the magazine.

10. In a machine tool for performing a variety of operations one at a time at an operating station with a succession of different tools comprising:

(a) a data input device to produce a predetermined sequence of input signals, each signal specifying a particular tool, (b) a circular magazine to store the tools, said magazine rotatable to bring tools to a transfer station, (c) a shaft rotatable with the magazine, (d) a finger for each tool, each finger mounted on the shaft and rotatable therewith unless restrained, each finger set relative to a reference line in accordance with the position of the tool in the drum with respect to the transfer station, (e) a plurality of stationary conductors mounted adjacent each finger and effective with the finger to initiate rotation of the magazine in one direction and the other, respectively, in response to a signal for that tool, the rotation of the magazine stopping when the finger is at said reference line and the tool is in the transfer station, (f) a stop to restrain the finger for that tool after termination of rotation of the magazine and hold said finger at said reference line until released, (g) transfer mechanism to exchange the tool in the transfer station with the tool in the operating station, (h) and means to release the stop for a restrained finger when the tool thereof is returned to the magazine at the transfer station.

11. Control apparatus for article handling mechanism, said mechanism including a storage magazine movable with respect to a transfer station, comprising in combination:

(a) a position sensor for each article stored in the magazine, each position sensor having a follower set in accordance with the position of the article in the magazine and each follower when not disabled movable with the magazine, (b) means to select a particular position sensor corresponding to a desired article in the magazine, (c) means operable in response to the position of the follower of the selected position sensor to stop the magazine when the desired article reaches the transfer station on movement of the magazine, (d) means to disable the follower of the selected position sensor when the desired article is removed from the magazine to prevent movement of said follower with the magazine, (e) and means to reactivate said follower when said article is returned to the magazine for resumed movement of said follower with the magazine.

12. Control apparatus for article handling mechanism, said mechanism including a storage magazine movable with respect to a transfer station and transfer mechanism to move articles to and from the magazine at the transfer station, comprising in combination:

(a) a position sensor for each article stored in the magazine, each position sensor having a follower set in accordance with the position of the article in the magazine relative to the transfer station, each follower when not disabled movable with the magazine, (b) means successively to select particular position sensors corresponding to a desired series of articles in the magazine, (c) means operable in response to the position of the follower of a selected position sensor to initiate movement of the magazine when the article corresponding to said position sensor is spaced from the transfer station, (d) means operable in response to the position of the follower of said selected position sensor to stop the magazine when said article is at the transfer station, (e) means to effect operation of said transfer mechanism to take an article from the storage magazine at the transfer station and replace an article in the magazine at the transfer station, (f) means to disable the follower of a position sensor for an article removed from the magazine by the transfer mechanism to prevent movement of said follower with the magazine, (g) and means to reactivate the follower of a position sensor for an article replaced in the magazine by the transfer mechanism to resume movement of said follower with the magazine.

13. In a machine tool, control apparatus for tool handling mechanism, said mechanism including a storage drum rotatable about an axis to move tools stored therein through a transfer station and including transfer mechanism to move tools to and from the transfer station, the combination comprising:

(a) a shaft rotatable with the storage drum, (b) a position sensor for each tool stored in the tool drum, each position sensor having a control element mounted on the shaft in an angular position corresponding to the position of the tool in the drum, each control element rotatable with the shaft when not restrained, (c) means successively to render effective particular position sensors corresponding to a desired series of tools from the magazine, (d) a motor operable in response to the position of the control element of the effective position sensor to initiate rotation of the storage drum when the desired tool is spaced from the transfer station, the rotation of the drum stopped in response to the position of said control element when the desired tool reaches the transfer station, (e) means to effect operation of said transfer mechanism to take a tool from the storage drum at the transfer station and replace a tool in the storage drum at the transfer station, (f) means to restrain the control element of a position sensor for a tool removed from the storage drum by the transfer mechanism, and (g) means to release the control element of a position sensor for a tool replaced in the storage drum by the transfer mechanism.

14. In a machine tool, control apparatus for a tool handling mechanism, said mechanism including a storage drum rotatable about an axis to move tools stored therein through a transfer station and including transfer mechanism to move tools to and from the transfer station, the combination comprising:

(a) a counter for each tool stored in the drum operable in response to rotation of the drum, each counter set in accordance with the position of the tool in the drum relative to the transfer station, (b) means successively to select particular counters corresponding to a desired series of tools from the magazine, (c) a motor operable in response to a selected counter to initiate rotation of the storage drum when the desired tool is spaced from the transfer station, the rotation of the drum stopped in response to operation of the counter when the desired tool reaches the transfer station, (d) means to effect operation of said transfer mechanism to take a tool from the storage drum at the transfer station and replace a tool in the storage drum at the transfer station, (f) means to render the counter of a tool removed from the drum at the transfer station ineffective on subsequent rotation of the drum, and (g) means to render the counter of a tool returned to the drum at the transfer station effective on subsequent rotation of the drum.

15. Mechanism for handling particular articles from a group of articles comprising:

(a) means to produce a different input signal for each of said group of articles, (b) a reader to receive said signals, said reader having an output terminal for each of said signals, (c) a plurality of control mechanisms, one for each of said particular articles, and (d) means to connect said control mechanisms to the output terminals of the reader for the signals of the particular articles handled.

16. Mechanism for handling particular articles from a group of articles comprising:

(a) means to produce a different input signal for each of said group of articles, (b) a reader to receive said signals, said reader having an output terminal for each of said signals, (c) a magazine to store the particular articles and move each article to a transfer station, (d) a position sensor for each article in the magazine, each position sensor effective to indicate the position of the particular article with respect to the transfer station and each connected to the reader output terminal at which the signal for that article appears, (e) and means to move the magazine in response to the position sensor for a particular article when the signal for that article is given.

17. Mechanism for handling particular tools from a group of tools to which code numbers have been assigned, (a) an input data device to produce a predetermined sequence of particular code numbers, (b) a reader to receive said signals, said reader having an output terminal for each code number, (c) a magazine to store the particular tools indicated on said input data device, said magazine rotatable to bring the tools therein to a transfer station, (d) a position sensor for each tool in the magazine, each position sensor effective to sense the position of a particular tool with respect to the transfer station and each connected to the reader output terminal at which the signal for that tool appears, and (e) a motor to rotate the magazine under the control of the position sensor for the tool called for on the input data device.

18. Mechanism for handling a group of different articles comprising:

(a) means defining a storage area for the articles, (b) means to produce a sequence of input signals, each signal specifying a particular article, (c) a position sensor for each article operable to sense the position of the article in the storage area, (d) means to transmit each input signal to the position sensor for the article specified by the signal, (e) means responsive to said position sensor to move the specified article in the storage area to a transfer station for removal from the storage area, (f) means to deactivate the position sensor for said specified article as said specified article is removed from said storage area at the transfer station, (g) and means to reactivate the position sensor for said specified article when said article is returned to the storage area at the transfer station.

19. Mechanism for handling a group of different articles comprising:

(a) a movable magazine for the articles, (b) means to produce a sequence of input signals, each signal specifying a particular article, (c) a position sensor for each article operable to sense the position of the article in the magazine, (d) means to transmit each input signal to the position sensor for the article specified by the signal, (e) means responsive to said position sensor to move the magazine and bring the specified article in the storage area to a transfer station for removal from the storage area, (f) means to deactivate the position sensor for said specified article as said specified article is removed from said storage area at the transfer station, (g) and means to reactivate the position sensor for said specified article when said article is returned to the storage area at the transfer station.

20. Mechanism for handling a group of different tools in a machine tool, the mechanism comprising:
   (a) a rotatable storage magazine for the tools,
   (b) means to produce a sequence of input signals, each signal specifying a particular tool,
   (c) a position sensor for each tool, each position sensor set to sense the position of the tool in the magazine and operable in response to rotation of the magazine continuously to sense the position of the tool while the tool is in the magazine,
   (d) means to transmit each input signal to the position sensor for the tool specified by the signal,
   (e) means responsive to said position sensor to rotate the magazine and bring the specified tool to a transfer station for removal from the magazine,
   (f) means to deactivate the position sensor for said specified tool as said specified tool is removed from said magazine at the transfer station,
   (g) and means to reactivate the position sensor for said specified tool when said tool is returned to the magazine at the transfer station.

21. In a machine tool for performing a variety of operations one at a time at an operating station with a succession of different tools comprising:
   (a) means to produce a sequence of input signals, each signal specifying a particular tool,
   (b) a magazine to store the tools, said magazine rotatable to bring selected tools to a transfer station,
   (c) a control element for each tool, each control element adjusted to correspond to the position of the tool in the magazine, each control element rotatable with the magazine unless restrained,
   (d) means responsive to the position of the control element for a particular tool specified by the input signal relative to a predetermined angular reference position to initiate rotation of the magazine and bring the particular tool to the transfer station, said rotation terminating when the control element for that tool is in said predetermined angular reference position,
   (e) means to move a tool out of and into the magazine at the transfer station,
   (f) means to restrain the control element for a particular tool when the tool is moved out of the magazine,
   (g) and means to release the control element for a particular tool when the tool is returned to the magazine.

22. In a machine tool for performing a variety of operations one at a time at an operating station with a succession of different tools comprising:
   (a) means to produce a sequence of input signals, each signal specifying a particular tool,
   (b) a magazine to store the tools, said magazine rotatable to bring selected tools to a transfer station,
   (c) a follower for each tool initially set to correspond to the position of the tool in the magazine, each follower operable on rotation of the magazine to follow the tool unless restrained,
   (d) means responsive to the follower for a particular tool specified by the input signal to effect rotation of the magazine and bring the particular tool to the transfer station,
   (e) means to move a tool out of and into the magazine at the transfer station,
   (f) and means to disable the follower for a particular tool when the tool is out of the magazine.

23. In a machine tool for performing a variety of operations one at a time at an operating station with a succession of different tools comprising:
   (a) means to produce a sequence of input signals, each signal specifying a particular tool,
   (b) a magazine having pockets to store the tools, said magazine rotatable to bring selected tools to a transfer station,
   (c) a shaft rotatable with the magazine,
   (d) a control element for each tool mounted on the shaft and rotatable therewith unless restrained,
   (e) means responsive to the position of the control element for a particular tool specified by the input signal to effect rotation of the magazine and bring the particular tool in a particular pocket to the transfer station, said rotation teminating when the control element for that tool is in a predetermined angular position,
   (f) means to move a tool out of and into the magazine at the transfer station,
   (g) means to deactivate the control element for said particular tool when the tool is taken out of the particular pocket of the magazine to preclude rotation of the control element when said particular pocket moves out of the transfer station on subsequent rotation of the magazine,
   (h) and means to reactivate the control element for said particular tool when the tool is replaced in the magazine in any pocket of the magazine.

24. Mechanism for handling a group of different articles comprising:
   (a) means defining pockets in a storage area for the articles,
   (b) means to produce a sequence of input signals, each signal specifying a particular article,
   (c) a position sensor for each article set to correspond to the position of the article in a particular pocket in the storage area and operable to sense the position of the article in that particular pocket as the pocket moves,
   (d) means to transmit each input signal to the position sensor for the article specified by the signal,
   (e) means responsive to said position sensor to move the particular pocket with the specified article to a transfer station in the storage area for removal of the specified article from said particular pocket,
   (f) means to deactivate the position sensor for said specified article as said specified article is removed from said particular pocket at the transfer station,
   (g) and means to reactivate the position sensor for said specified article when said article is returned to any pocket in the storage area at the transfer station.

No references cited.

RICHARD H. EANES, JR., *Primary Examiner.*

UNITED STATES PATENT OFFICE
CERTIFICATE OF CORRECTION

Patent No. 3,277,569            October 11, 1966

John F. Verhoeven

It is hereby certified that error appears in the above numbered patent requiring correction and that the said Letters Patent should read as corrected below.

Column 28, lines 68, 69, 72 and 75, for "storage area", each occurrence, read -- magazine --.

Signed and sealed this 29th day of August 1967.

(SEAL)
Attest:

ERNEST W. SWIDER            EDWARD J. BRENNER
Attesting Officer            Commissioner of Patents